US012248949B2

(12) United States Patent
Mittal et al.

(10) Patent No.: US 12,248,949 B2
(45) Date of Patent: Mar. 11, 2025

(54) MEDIA CONTENT ENHANCEMENT BASED ON USER FEEDBACK OF MULTIPLE VARIATIONS

(71) Applicant: ADOBE INC., San Jose, CA (US)

(72) Inventors: Trisha Mittal, San Jose, CA (US); Viswanathan Swaminathan, Saratoga, CA (US); Ritwik Sinha, Cupertino, CA (US); Saayan Mitra, San Jose, CA (US); David Arbour, San Jose, CA (US); Somdeb Sarkhel, San Jose, CA (US)

(73) Assignee: Adobe Inc., San Jose, CA (US)

( * ) Notice: Subject to any disclaimer, the term of this patent is extended or adjusted under 35 U.S.C. 154(b) by 74 days.

(21) Appl. No.: 17/519,311

(22) Filed: Nov. 4, 2021

(65) Prior Publication Data

US 2023/0139824 A1    May 4, 2023

(51) Int. Cl.
G06Q 30/0201        (2023.01)
G06N 20/00          (2019.01)

(52) U.S. Cl.
CPC ......... *G06Q 30/0201* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,087,178 B2 * | 8/2021 | Naveh | ................ | G06F 16/5866 |
| 11,537,506 B1 * | 12/2022 | Dasgupta | ............ | G06F 11/1476 |
| 2019/0311301 A1 * | 10/2019 | Pyati | ..................... | G06F 16/901 |
| 2020/0334486 A1 * | 10/2020 | Joseph | ...................... | G06T 5/20 |
| 2021/0334993 A1 * | 10/2021 | Woodford | .............. | G06T 5/006 |
| 2022/0019849 A1 * | 1/2022 | Kim | ......................... | G06N 3/08 |
| 2022/0108138 A1 * | 4/2022 | Kehler | .................. | G06F 18/295 |
| 2022/0138511 A1 * | 5/2022 | Xu | ......................... | G06N 3/082 |
| | | | | 706/15 |

FOREIGN PATENT DOCUMENTS

KR          20200107389 A  *  9/2020

OTHER PUBLICATIONS

Rudinac et al. ("Learning Crowdsourced User Preferences for Visual Summarization of Image Collections," in IEEE Transactions on Multimedia, vol. 15, No. 6, pp. 1231-1243, Oct. 2013 (Year: 2013).*

(Continued)

*Primary Examiner* — Chesiree A Walton
(74) *Attorney, Agent, or Firm* — Shook, Hardy & Bacon L.L.P.

(57) ABSTRACT

Various disclosed embodiments are directed to using one or more algorithms or models to select a suitable or optimal variation, among multiple variations, of a given content item based on feedback. Such feedback guides the algorithm or model to arrive at suitable variation result such that the variation result is produced as the output for consumption by users. Further, various embodiments resolve tedious manual user input requirements and reduce computing resource consumption, among other things, as described in more detail below.

17 Claims, 14 Drawing Sheets

(56) References Cited

OTHER PUBLICATIONS

Balandat, M., et al., "Botorch: Programmable Bayesian Optimization in Pytorch", arXiv:1910.06403v1, pp. 1-20 (Oct. 14, 2019).
Boerman, S. C., et al., "Online Behavioral Advertising: A Literature Review and Research Agenda", Journal of Advertising, vol. 46, No. 3, pp. 363-376 (2017).
Bradski, G., and Kaehler, A., "Learning OpenCV", O'Reilly Media, Inc., pp. 1-571 (2008).
Broder, A. Z., "Computational Advertising and Recommender Systems", Proceedings of the ACM Conference on Recommender systems, p. 1 (2008). (Only Abstract Submitted).
Cai, S., et al., "Weakly-supervised Video Summarization using Variational Encoder-Decoder and Web Prior", In Proceedings of the European Conference on Computer Vision (ECCV), pp. 1-17 (2018).
Crook, T., et al., "Seven Pitfalls to Avoid when Running Controlled Experiments on the Web", In Proceedings of the 15th ACM SIGKDD International Conference on Knowledge Discovery and Data Mining, pp. 1-9 (2009).
Dave, K., and Varma, V., "Computational Advertising: Techniques for Targeting Relevant Ads", Foundations and Trends in Information Retrieval, vol. 8, No. 4-5, pp. 1-49 (2014).
Dixon, E., et al., "A/B Testing of a Webpage", U.S. Pat. No. 7,975,000, pp. 1-10 (Jul. 5, 2011).
Dou, Q., et al., "Webthetics: Quantifying webpage aesthetics with deep learning", International Journal of Human-Computer Studies, vol. 124, pp. 56-66 (2019).
Gardey, J. C., and Garrido, A., "User Experience Evaluation through Automatic A/B Testing", In Proceedings of the 25th International Conference on Intelligent User Interfaces Companion, pp. 25-26 (Mar. 17-20, 2020).
Garnett, R., et al., "Bayesian Optimization for Sensor Set Selection", In Proceedings of the 9th ACM/IEEE International Conference on Information Processing in Sensor Networks, pp. 1-11 (Apr. 12-16, 2010).
Gilotte, A, et al., "Offline A/B testing for Recommender Systems", In Proceedings of the Eleventh ACM International Conference on Web Search and Data Mining, arXiv:1801.07030v1, pp. 1-9 (Jan. 22, 2018).
Gu, H., and Swaminathan, V., "From Thumbnails to Summaries—A Single Deep Neural Network to Rule Them All", In IEEE International Conference on Multimedia and Expo (ICME), pp. 1-6 (2018).
Gygli, M., and Soleymani, M., "Analyzing and Predicting GIF Interestingness", In Proceedings of the 24th ACM International Conference on Multimedia, pp. 122-126 (Oct. 15-19, 2016).
Gygli, M., et al., "Video2GIF: Automatic Generation of Animated GIFs from Video", In Proceedings of the IEEE Conference on Computer Vision and Pattern Recognition, pp. 1001-1009 (2016).
Hou, W., et al., "Blind Image Quality Assessment via Deep Learning", IEEE Transactions on Neural Networks And Learning Systems, vol. 26, No. 6, pp. 1275-1286 (Jun. 2015).
Hu, Y., et al., "Exposure: A White-Box Photo Post-Processing Framework", ACM Transactions on Graphics (TOG), vol. 37, No. 2, pp. 1-23 (2018).
Ji, Z., et al., "Video Summarization with Attention-Based Encoder-Decoder Networks", IEEE Transactions on Circuits and Systems for Video Technology, arXiv:1708:09545v2, pp. 1-9 (Apr. 16, 2018).
Jones, D. R., et al., "Efficient Global Optimization of Expensive Black-Box Functions", Journal of Global Optimization, vol. 13, pp. 455-492 (1998).
Kim, H., et al., "Exploiting Web Images for Video Highlight Detection With Triplet Deep Ranking", IEEE Transactions on Multimedia, vol. 20, No. 9, pp. 2415-2426 (Sep. 2018).
Klein, A., et al., "Fast Bayesian Optimization of Machine Learning Hyperparameters on Large Datasets", Proceedings of the 20th International Conference on Artificial Intelligence and Statistics (AISTATS), pp. 1-9 (2017).
Kohavi, R., et al., "Controlled experiments on the web: survey and practical guide", Data Mining and Knowledge Discovery, vol. 18, pp. 140-181 (2009).
Kohavi, R., et al., "Online Controlled Experiments at Large Scale", In Proceedings of the 19th ACM SIGKDD International Conference on Knowledge Discovery and Data Mining, pp. 1-9 (Aug. 11-14, 2013).
Kohavi, R., et al., "Seven Rules of Thumb for Web Site Experimenters", In Proceedings of the 20th ACM SIGKDD International Conference on Knowledge Discovery and Data Mining, pp. 1-10 (Aug. 24-27, 2014).
Li, L., et al., "A Contextual-Bandit Approach to Personalized News Article Recommendation", In Proceedings of the 19th International Conference on World Wide Web, pp. 661-670 (Apr. 26-30, 2010).
Martinez-Cantin, R., et al., "A Bayesian Exploration-Exploitation Approach for Optimal Online Sensing and Planning with a Visually Guided Mobile Robot", Autonomous Robots, pp. 1-11 (Aug. 2009).
Mockus, J., "On Bayesian Methods for Seeking the Extremum", In Optimization techniques IFIP Technical Conference, pp. 1-5 (1975).
Moran, S., et al., "DeepLPF: Deep Local Parametric Filters for Image Enhancement", In Proceedings of the IEEE/CVF Conference on Computer Vision and Pattern Recognition, pp. 12826-12835 (2020).
Pan, H., et al., "Detection of Slow-Motion Replay Segments in Sports Video for Highlights Generation", In IEEE International Conference on Acoustics, Speech, and Signal Processing, vol. 3, pp. 1-4 (2001).
Prabhakar, K. R., et al., "DeepFuse: A Deep Unsupervised Approach for Exposure Fusion with Extreme Exposure Image Pairs", Proceedings of the IEEE International Conference on Computer Vision (ICCV), pp. 4714-4722 (2017).
Rahutomo, R., et al., "Improving Conversion Rates for Fashion e-Commerce with A/B Testing", International Conference on Information Management and Technology (ICIMTech), IEEE, pp. 266-270 (Aug. 2020).
Shan, Q., et al., "The Visual Turing Test for Scene Reconstruction", In International Conference on 3D Vision—3DV, IEEE, pp. 1-8 (2013).
Shen, Y., et al., "Deep Learning for Multimodal-Based Video Interestingness Prediction", In EEE International Conference on Multimedia and Expo (ICME), pp. 1-7 (2017).
Shin, D., et al., "Enhancing Social Media Analysis with Visual Data Analytics: A Deep Learning Approach", Article in MIS Quarterly, pp. 1-68 (Dec. 2020).
Sjoberg, A., et al., "Architecture-Aware Bayesian Optimization for Neural Network Tuning", In International Conference on Artificial Neural Networks, pp. 220-231 (2019).
Talebi, H., and Milanfar, P., "Nima: Neural Image Assessment", IEEE Transactions on Image Processing, vol. 27, No. 8, pp. 3998-4011 (Aug. 2018).
Tang, D., et al., "Overlapping Experiment Infrastructure: More, Better, Faster Experimentation", In Proceedings of the 16th ACM SIGKDD International Conference on Knowledge Discovery and Data Mining, pp. 1-10 (Jul. 25-28, 2010).
Wang, S., et al., "Video Interestingness Prediction Based on Ranking Model", In Proceedings of the Joint Workshop of the 4th Workshop on Affective Social Multimedia Computing and First Multi-Modal Affective Computing of Large-Scale Multimedia Data, pp. 55-61 (Oct. 26, 2018).
Xiong, B., et al., "Less is More: Learning Highlight Detection from Video Duration", In Proceedings of the IEEE Conference on Computer Vision and Pattern Recognition, pp. 1258-1267 (2019).
Xu, Y., et al., "From Infrastructure to Culture: A/B Testing Challenges in Large Scale Social Networks", In Proceedings of the 21th ACM SIGKDD International Conference on Knowledge Discovery and Data Mining, pp. 1-10 (2015).
Yan, J., et al., "A Learning-to-Rank Approach for Image Color Enhancement", In Proceedings of the IEEE Conference on Computer Vision and Pattern Recognition, pp. 1-8 (2014).
Yuan, A., and Li, Y., "Modeling Human Visual Search Performance on Realistic Webpages Using Analytical and Deep Learning Methods", In Proceedings of the CHI Conference on Human Factors in Computing Systems, pp. 1-12 (Apr. 25-30, 2020).

(56) References Cited

OTHER PUBLICATIONS

Zhou, K., et al., "Deep Reinforcement Learning for Unsupervised Video Summarization with Diversity-Representativeness Reward", The Thirty-Second AAAI Conference on Artificial Intelligence, pp. 7582-7589 (2018).

* cited by examiner

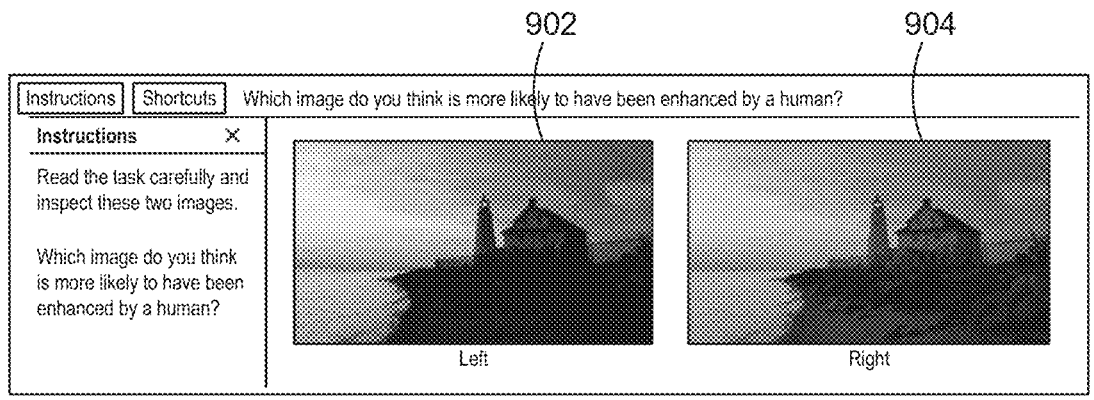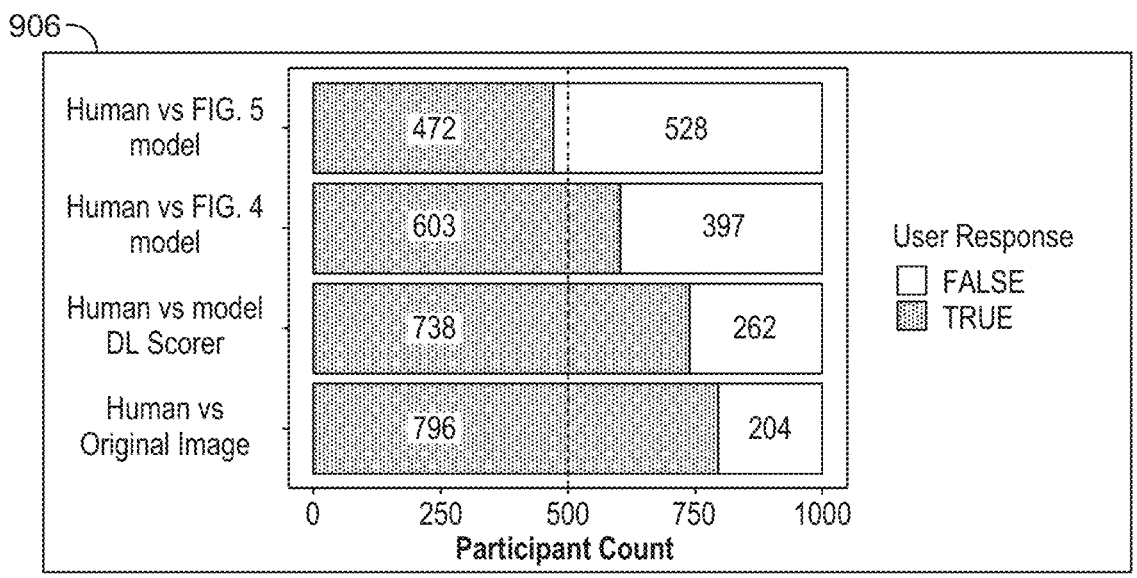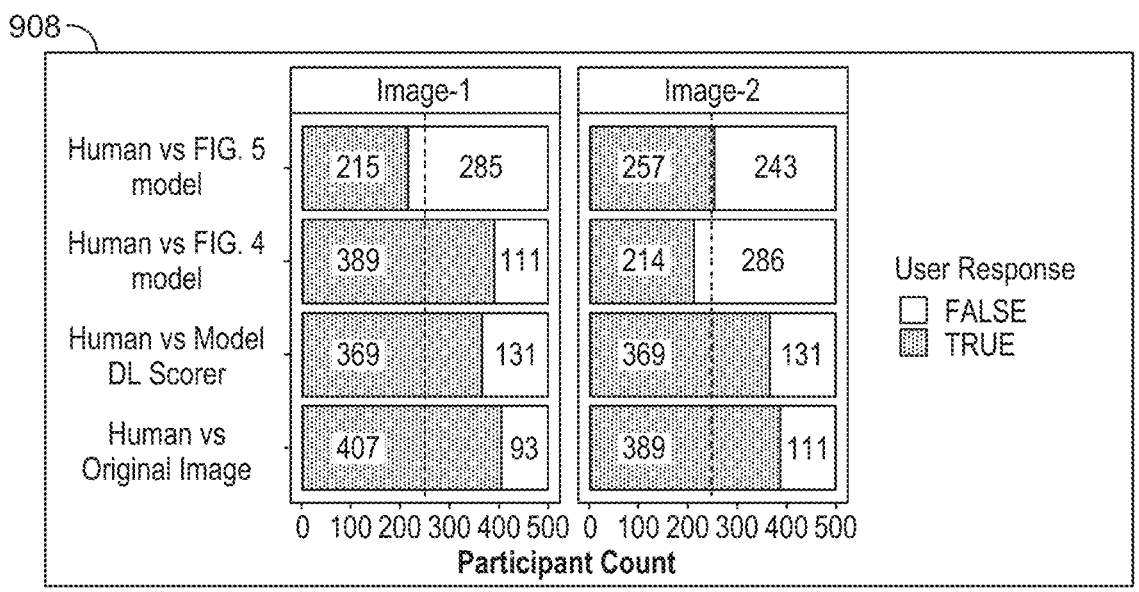
FIG. 9

MEDIA CONTENT ENHANCEMENT BASED ON USER FEEDBACK OF MULTIPLE VARIATIONS

BACKGROUND

There has been rapid growth in the sharing and consuming of media content, such as digital pictures or videos. Consequently, this is driving the need to enhance such media content so that it is suitable for particular tasks and users. For example, users desire to share high quality images on their social media threads, content creators desire to promote their unique art using high quality images, users desire to exchange interesting Graphics Interchange Format (GIF) images, and various companies rely on digital marketing to reach their consumers with media content that is most the most aesthetically desirable to their consumers.

Although existing technologies enhance media content, they have many shortcomings. For example, some machine learning models can automate the enhancement of media content by fusing or merging different images. In another example, media editing software provide tools (e.g., cut, paste, select) to users so that they can modify visual data of digital images and video to enhance them. However, these and other technologies are generally inaccurate in enhancing media content because they fail to, among other things, intelligently automate media content enhancement based on deriving user feedback on multiple variations (e.g., different brightness and contrast values) of the same content item. Moreover, these technologies consume an unnecessary amount of computing resources (e.g., CPU/GPU).

SUMMARY

One or more embodiments including methods, systems, and non-transitory computer readable media use one or more algorithms or models (e.g., Bayesian Optimization (BO), reinforcement learning, or active learning) to select a suitable or optimal variation, among multiple variations, of a given content item (e.g., an image or video), which improves existing technologies. For example, for specific image, a model may produce several variations of the image by changing contrast, sharpness, and brightness values and then select the most optimal variation. To make such selection of the suitable or optimal variation, particular embodiments receive human feedback on these variations, such as explicit user ratings (e.g., "Awful," "Okay," or "good"). Such feedback guides the algorithm or model to arrive at suitable variation result such that the variation result is produced as the output for consumption by users. Further, various embodiments resolve tedious manual user input requirements and reduce computing resource consumption, among other things, as described in more detail below.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Aspects of the present technology are described in detail below with reference to the attached drawing figures, wherein:

FIG. 4 is a screenshot of an example user interface used to derive explicit user feedback, according to some embodiments.

FIG. 5 is a screenshot of an example user interface used to derive explicit user feedback, according to some embodiments.

FIG. 9 is a schematic diagram illustrating a Visual Turing Test, which indicates some improvements over existing technologies, according to some embodiments.

DETAILED DESCRIPTION

Overview

Figure 1:
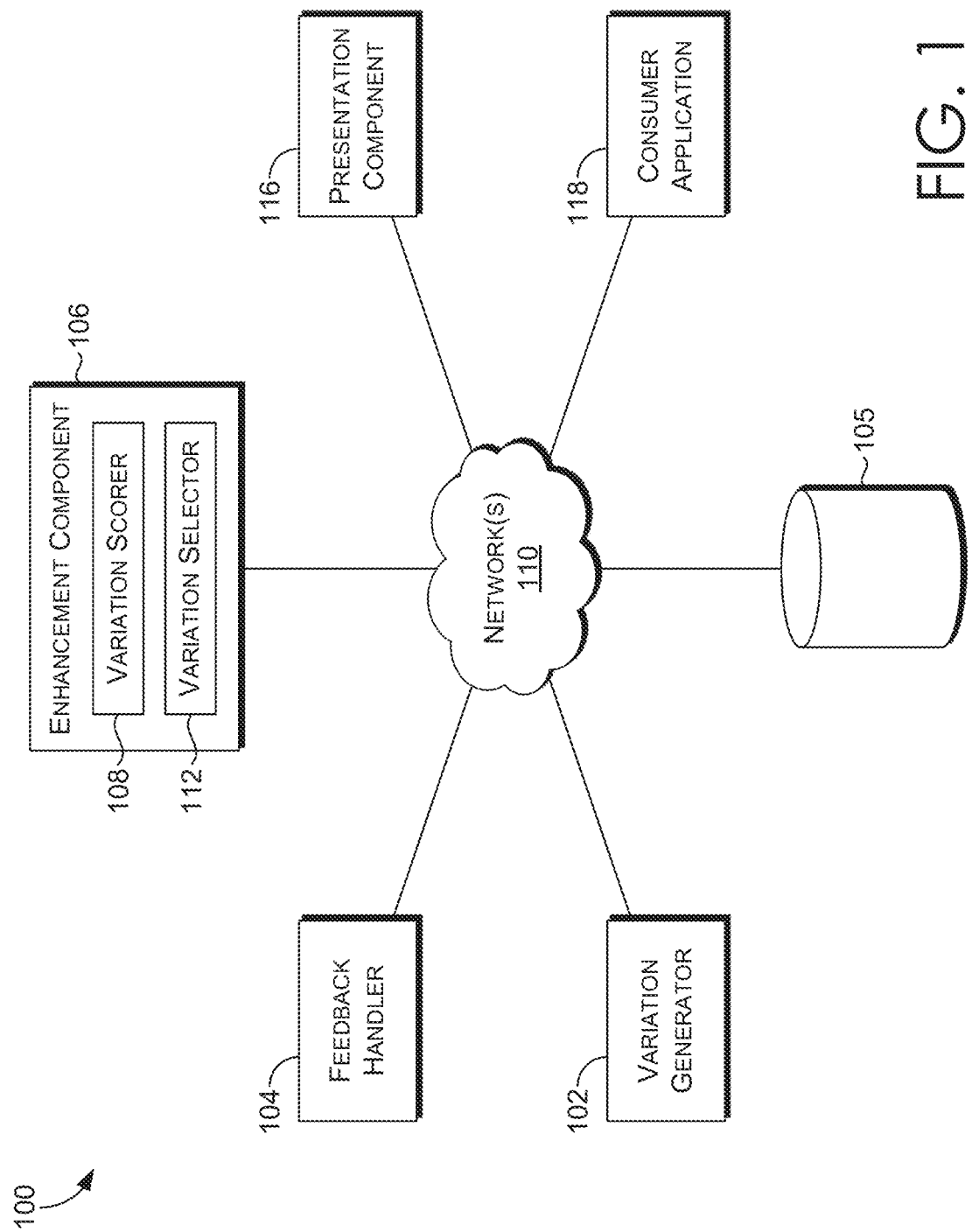
FIG. 1 is a block diagram of a computing system architecture in which aspects of the present disclosure are employed, according to some embodiments.

For content to be effective (e.g., better conversion rates, increased content sharing, higher click-through rates) among users, optimizing or enhancing images and videos is a crucial step. There has been immense efforts in understanding how content can be enhanced for each consumer for both decision making (consumer interests based on their online history) and for measuring the impact of the content through click-through rates, conversion rates, and the like.

Some software applications employ functionality that enhances media content by selecting the best version, of multiple versions, of an input image. To select the best version, these software applications and others use A/B testing concepts. In an A/B test, two types (a "control" and "variant") of the content are created and are shown to two random subsets of users. As users are served either the control or variant types, their engagement (e.g., clicks) with each experience is collected and analyzed. Based on tallying their engagement, a final version is selected as the "best" one. However, A/B testing requires manually gathering potential variants to be tested and a significant amount of human audience or users to reach a statistically significant result. These A/B tests often require tens of thousands or millions of users to declare a winner media content variant for the test. This is not only time-consuming but is costly in terms of computer resource consumption, as described in more detail below.

Further, only a handful of versions of an image can be tested in A/B testing. This is problematic because many types of media content enhancement involves editing feature (also referred to herein as "parameter") values, which are continuous. This means that the features can take on an infinite number of different values. For example, in an image, one may be interested in adjusting the shadows, brightness, contrast, saturation, vibrance, and the like. For each of these, the content creator can choose an infinite number of possible pixel values. This leads to an impossibly large sample space to conduct a suitable A/B test. Accordingly, because A/B testing can only handle a very small of discrete variants, the optimization or selection of a variant is inaccurate, especially where feature values are continuous.

There are various deep learning based models that automate content enhancement, but they have various shortcomings. For images, these models try to enhance and edit the image to its best version. For videos, these models perform various tasks like video summarization and highlight generation. Similarly, for web pages, these models engage in automated approaches for web page aesthetics and layout. However, these deep learning models have difficulty in generalizing to new data post deployment because of the need of large and specific training data (e.g., millions of content-feedback pairs), which is typically not feasible. This is especially the case when parameters are continuous for variants. Consequently, these models often experience underfitting issues, leading to inaccurate predictions (e.g., of the best image) because of the lack of specific training data.

Further, these models also lack any form of human feedback in the optimization process, leading to inaccuracies. Enhancing or optimizing images typically and inherently requires some form of subjectivity. This is because what constitutes the "best" or suitable image is most accurately determined when receiving human input on factors such as color, shading, effects, and the like. For example, a model may warp an image that combines several training images to enhance the image. However, this functionality fails to consider what image, among many candidate images, is the most aesthetically pleasing to users. Accordingly, selecting or enhancing the image may be inaccurate without human feedback.

There are also media editing software applications that provide tools to users so that they can modify visual data of digital images and video to enhance images. However, these applications are not only complex and require extensive knowledge to use, but they require a substantial amount of manual user input, which is tedious for the user experience. Accordingly, these applications do not employ adequate functionality to automatically enhance media content.

These existing technologies and others also unnecessarily consume computing resources, such as memory and CPU/GPU. For example, because certain media content parameters (e.g., sharpness, contrast) are continuous in nature, some models require large and specific training data sets to account for these several parameter values. Consequently, these models must search a very large search space of vectors of different parameter values in order to enhance an image. Performing such search on these large data sets increases CPU latency or network latency and otherwise causes computational bottlenecks because of the need to process image content with continuous and infinite parameter values. Further, the training data unnecessarily consumes memory and other storage costs because the size of the data is very large. Moreover, as described above, A/B tests often require tens of thousands or millions of users and corresponding user input to declare a winner media content variant for the test, which leads to a large amount of unnecessary data being stored to memory.

Existing technologies also require extensive manual user input, which also unnecessarily consumes computing resources. For example, as described above, A/B testing requires manually inputting a substantial amount of potential variants to be tested and tens of thousands or millions of users and their input to declare a winner media content variant for the test. As further described above, media editing software applications require a substantial amount of manual user input, such a cutting, pasting, applying different filters, or image effects to images to enhance them. All of these repetitive manual user inputs require users to scroll through, drill down, issue multiple queries, or otherwise make repeated selections before the user enhances an image in the way she is please with. This increases storage device I/O (e.g., excess physical read/write head movements on non-volatile disk) because each time a user makes these selections, the system has to repetitively reach out to the storage device to perform read/write operations, which is time consuming, error prone, and eventually wears on components, such as a read/write head due to the mechanical cost for the read/write head to locate the correct data for every I/O operation.

Additionally, with session or network-based web applications, each user input requires packet generation costs (e.g., input header information) for network protocols (e.g., TCP/IP), which increases network latency after repeated selections being transmitted over a network. For instance, each time a user clicks on a page of image effect options to choose from or issues a different query to obtain a different image effect candidate, packet headers have to be exchanged and the payload of the data has to traverse the network.

Various embodiments of the present disclosure provide one or more technical solutions to these technical problems, and others, as described herein. In operation, some embodiments are directed to using one or more optimization algorithms or models (e.g., Bayesian Optimization (BO), reinforcement learning, or active learning) to select a suitable or optimal variation among multiple variations based on eliciting human feedback on these variations. Such human feedback guides the optimization algorithm to arrive at a suitable variation result such that the variation result is produced as the output for consumption by users.

In an illustrative example, some embodiments first receive an input image and automatically change the vibrance, saturation, brightness, contrast, and/or sharpness values to create several variations of the input image. Responsively, some embodiments elicit user feedback on each of these variations by asking users to rate these variations on a Likert scale (e.g., "awful," okay," "great"). Responsively, such user feedback is used to, for example, update a belief model (i.e., a surrogate model) of a BO algorithm. As it relates to aspects of the present technology, BO is an iterative approach of finding the most aesthetically desirable (or a suitable) media content item using the least amount of human feedback as possible. This is because BO does not have to evaluate an objective function. In some embodiments, the objective function (which is unknown) is to find the most optimal (or a suitable) variation by analyzing a true distribution of human feedback scores of variations. The objective function may take into account feedback scores of all users for all variations that contain every conceivable parameter value. However, the true distribution of feedback scores is unknown because: the subjective nature of human feedback, there are billions of different humans (many of which will never be able to give feedback), and there is an infinite amount of variations of a media content item that can be made. Moreover, it would be computationally infeasible to evaluate anything close to the objective function.

Instead of engaging in evaluating the objective function, BO iteratively learns a surrogate function, which approximates the true objective function by accurately modeling the true distribution of ground truth feedback scores. Specifically, BO learns the surrogate function, which directs how an acquisition function (e.g., Expected Improvement (EI)) is used to iteratively generate or sample only a portion of variations based on a few user feedback scores in order to derive an optimal or suitable variation, as described in more detail below. In this way, particular embodiments do not have to elicit user feedback from a lot of users on a lot of variations, but still maintains high accuracy for predicting optimal variations relative to what the ground truth objective function would yield.

Various embodiments of the present disclosure improve existing technologies that employ A/B testing. As described above, only a few versions of an image can be tested in A/B testing, leading to inaccurate results because certain media content items can be enhanced by changing an infinite amount of parameter values (e.g., sharpness and contrast). Accordingly, any selected "best" version is often a false positive in these situations. However, various embodiments can test or analyze any media content item with any amount of parameter values. In some instances, this is because certain embodiments use models that automate the variant generation or receiving process, thereby removing road blocks to obtain as many version as possible in the least amount of time. In other instances, this is due, in part, because some embodiments generate or sample a set of variations as part of a function (e.g., a surrogate function) that approximates a ground truth distribution of feedback scores so that even images with a lot of conceivable parameter values are taken into account.

Various embodiments also improve the accuracy of existing deep learning machine learning models. As described above, existing models lack any form of human feedback in the optimization process, leading to inaccuracies. Conversely, various embodiments use human or user feedback. What constitutes the "best" or suitable image is often most accurately determined when receiving human input on factors. In other words, particular embodiments consider what variation, among many variations, is the most aesthetically desirable to users to guide the selection process. Accordingly, selecting or enhancing the image is accurate because human feedback that is derived.

Additionally, various embodiments also improve the accuracy of deep learning models because particular embodiments do not have difficulty in generalizing to new data since there are not likely to be underfitting issues based on the lack of large and specific training data often needed. As described herein, various embodiments do not need a large and specific training data set because they learn or use a function (e.g., a surrogate function) that mimics the objective function or true distribution of user feedback scores so not as many variations and user feedback scores need to be analyzed. And instead of having one or a few human experts labelling data to indicate whether an image is aesthetically preferred as existing models do, different humans or users themselves annotate the data (via their feedback scores of variations), which indicates true or real human feedback, thereby leading to better accuracy.

Various embodiments of the present disclosure also improve the way computers operate by reducing the amount of computing resources, such as CPU/GPU. As described above, existing models must search a very large search space of vectors of different parameter values in order to enhance an image, especially when parameter values are continuous in nature. However, particular embodiments do not have to perform such search on these large data sets. This is at least partially because some embodiments allow configuration users to set the boundaries or ranges of parameter values for which a model will generate variations from. For example, a user can set a saturation range between 0.2 and 0.5. Responsively, a model may only generate variations between this range and not generate variations below 0.2 and above 0.5. Accordingly, these embodiments do not have to search on as large of a search space of vectors relative to existing technologies. Therefore, this decreases CPU latency or network latency and does not cause computational bottlenecks. Further, because embodiments use a function that mimics the true distribution of use feedback scores, these embodiments do not have to search as large of a search space of vectors.

Further, as described above, user feedback scores for particular variations do not unnecessarily consumes memory and other storage costs because the size of the data is not large (e.g., because of the learned surrogate function), unlike existing technologies. Moreover, as described above, A/B tests often require tens of thousands or millions of users and corresponding user input to declare a winner media content variant for the test (even though this is infeasible). However, because of the learned function that approximates the objective function, there are not as many users and input needed to make robust predictions. Accordingly, there is no need for a large amount of unnecessary data being stored to memory.

Particular embodiments also improve storage device I/O by reducing the amount of user input via automating content enhancement based on unique rules. As described above, existing technologies, such as A/B tests and editing software require extensive manual user input, which also unnecessarily consumes computing resources. However, particular embodiments do not require manually inputting a substantial amount of potential variants to be tested and tens of thousands or millions of users and their input to declare a winner media content variant for the test. And they do not require a substantial amount of manual user input. Rather, particular embodiments automate the generation and selection of variants based on unique rules, such as user feedback and/or a model that approximate a true distribution. This decreases storage device I/O (e.g., excess physical read/write head movements on non-volatile disk) because by avoiding the repeated manual user selections described above, these embodiments do not have to repetitively reach out to the storage device to perform read/write operations. Therefore, these embodiments are not as error prone, and place a significantly less amount of wear on components, such as a read/write head due to fewer mechanical movements of the read/write head to locate the correct data for every I/O operation. Additionally, various embodiments reduce packet generation costs for network protocols (e.g., TCP/IP), which reduces network latency because these embodiments avoid repeated selections and other manual user input being transmitted over a network.

Definitions

Various terms are used throughout, some of which are described below:

In some embodiments, a "media content item" refers to or includes: an image, a set of images, a video, an audio segment, graphics (e.g., digital art), streamed content, computer animation (e.g., a skinned mesh), a document, text or other characters (e.g., numbers or symbols), and/or any other suitable content. In some embodiments, an "image" refers to a visual representation of one or more portions of the real world via pixels that represents the one or more portions of the real world. For example, an image can be a digital photograph, a graphic image file (e.g., JPEG, PNG, etc.), a picture (or sub-element of a picture), and/or a bitmap among other things. In some embodiments, an "image" includes pixels that do not necessarily represent the real world, but abstract concepts (e.g., stippling or other effects or patterns in art).

In some embodiments, a "variation" (also referred to as a "variant") refers to a first media content item that resembles at least a second media content item except that the variation includes one or more feature (also referred to as "parameter") values that are not included in the second media content item or vice versa. When a variation "resembles" a media content item, this means that the variation contains pixel intensity values (e.g., sharpness, contrast, or saturation), effects (e.g., shading, texture, "glitch" effects, "shimmer" effects, "water color" effects, animation effects, etc.), and/or actual content (e.g., objects representing real world objects, background, and/or foreground) that are substantially similar to the media content item but has at least one different feature value (e.g., pixel intensity value, effect, and/or actual content) that the media content item does not have. For example, a media content item can be an image of a real world brown dog. The variation of this media content item can be of the same real world dog, but instead of a brown feature value, the feature value may be black such that the variation represents a real world black dog.

In some embodiments, the term "user feedback" (also referred to as "audience feedback") for a variation is data that indicates user preference(s) associated with the variation. In some embodiments, user preferences are indicative of a degree (e.g., "like," "ok," "don't like") of aesthetic quality of a variation regardless of whether the user actually prefers the variation or not. Accordingly, for example, a "user preference" can be that the user does not like a variation. In some embodiments, user feedback is either explicit or implicit. "Explicit" user feedback is indicative of a direct rating or assessment of a variation by a user. For example, if a user was given an image, the user may be asked to rate the image on a scale of 1 to 5. Accordingly, an "explicit" user preference may be any number on this scale. "Implicit" user feedback refers to data that indirectly indicates user preference for a variation itself or some other data object associated with the variation (e.g., an item listing of a product for sale that includes a variation). For example, the quantity of clicks, views, shares, and the like of a page containing the variation may indirectly indicate that a user prefers a variation. In another example, implicit user feedback may be attributes extracted about a user, such as gender or age.

In some embodiments, the term "model" refers to a mathematical representation, process, or algorithm that represents an event (e.g., a real world event), system, behavior, or phenomenon. For example, a model can refer to a statistical model (e.g., via regression, sampling, or probability) and/or or a machine learning model. The term "machine learning model" refers to a model that is used for machine learning tasks or operations. In various embodiments, a machine learning model can receive an input (e.g., an input image) and, based on the input, identify patterns or associations in order to predict a given output (e.g., predict that the image style of the target image is of a certain class). Machine learning models can be or include any suitable model, such as one or more: neural networks (e.g., CNN), Bayesian networks, Random Forests, Boosted Trees, etc. "Machine learning" as described herein, and in particular embodiments, corresponds to algorithms that parse or extract features of historical data, learn (e.g., via training) about the historical data by making observations or identifying patterns in data, and then receive a subsequent input (e.g., a current target image) in order to make a determination, prediction, and/or classification of the subsequent input based on the learning without relying on rules-based programming (e.g., conditional statement rules).

Exemplary System

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1300 of FIG. 13). Alternatively, some or each of the components may be distributed among various computing devices, such as in a distributed cloud computing environment. In some embodiments, the system 100 and each of the components are located within the server and/or user device of FIG. 12, as described in more detail herein.

The system 100 includes network 110, which is described in connection to FIG. 12, and which communicatively couples components of system 100, including the variation generator 102, the feedback handler 104, the enhancement component 106, the presentation component 116, the consumer application 118, and storage 105 (e.g., RAM, a disk array, or a relational database). The components of the system 100 may be embodied as a set of compiled computer instructions or functions, program modules, computer software services, logic gates, or an arrangement of processes carried out on one or more computer systems.

The system 100 generally operates to select or render a particular variation of an image content item, which represents a suitable (e.g., the most optimal) variation to produce at the output (e.g., to a user interface page). The variation generator 102 is generally responsible for generating, receiving, or otherwise deriving a set of variations. In some embodiments, the variation generator 102 automatically generates variants. For example, at a first time, the variation generator 102 can receive an input image and using the input image, automatically and randomly change parameter (saturation, vibrance, brightness, and contrast) values of the input image, where each change represents a different variation of the content item. All of these values can be randomly changed on a continuous scale (e.g., 0 to 1). Such randomization may include using any suitable randomization sampling techniques, such as simple random sampling, stratified random sampling, cluster random sampling, and systemic random sampling.

Alternatively or additionally, in some embodiments, the variation generator 102 generates variations based on user input to set feature values. For example, before providing users with different variations of a content item to provide feedback on, a user interface may be provided to a configuration user so that the user can set a baseline range of parameter values that they would like produced for content items. In this way, only variations with values that fit within the range are generated and those that fall outside of the range are not generated. In an illustrative example, a user may set or select a contrast value range of −200 to 200. Such setting acts as a request to generate multiple variants with contrast values between −200 to 200 (and not generate variations that are between −255 to −201 or 201 to 255).

Alternatively or additionally, in some embodiments, the variation generator 102 generates variations based on user feedback (e.g., a Likert scale indicating how much the user liked the image) and/or updating a model (e.g., a belief model). For example, for a first iteration of a Bayesian Optimization (BO) algorithm, the variation generator 102 may generate variations. Subsequently, users may provide feedback on those randomly generated variations. Responsively, a belief model of a BO algorithm may be updated to learn a surrogate function, which is described in more detail below. Responsively, the variation generator 102 may, at a second iteration of the BO algorithm, generate a second set of variations, as described in more detail below.

In some embodiments, the feedback handler 104 is generally responsible for receiving or storing, to the storage 105, explicit or implicit feedback produced by users on the variants generated by the variation generator 102. In an example illustration of explicit feedback, the feedback handler 104 can produce (or caused to be produced) web pages that include images produced by the variation generator 102, along with a Likert scale test so that users can rate how much they like each of the variations generated by the variation generator 102. The feedback handler 104 may subsequently receive such user feedback and store, for example, the user feedback Likert scale ratings and corresponding images (or hashes representing the images) as an entry (e.g., a database record) in a data store, such as 105.

In an illustrative example of implicit feedback, the feedback handler 104 can track user activity or engagement on application pages, windows, user interfaces, or the like and then store such user activity (or hashes representing the user activity) and corresponding metadata to storage 105. For example, in response to detecting that a user has shared an image, the feedback handler 104 can generate an entry in a data structure that indicates that user Y has shared a particular image with specific parameter values at date X. This type of user feedback is implicit because the user is not directly rating media content items, but is rather performing user input for other tasks. In this way, for example, the detecting or tracking of user activity may be a background task that is automated. In some embodiments, however, implicit feedback is not feedback directly elicited from users, but can be data (e.g., attributes, such as age or gender) elicited from third party entities (e.g., a registration database) that users have accounts with and have entered their information. In some embodiments, such detection or tracking of user activity occurs through any suitable functionality, such as bot crawling or data scraping of currently opened pages or windows, recording session activity, collection an analysis of user activity logs (e.g., at a third party registration data store) after some batched time interval, keystroke logging, screenshot capturing, and the like.

Alternatively or additionally, in some embodiments, the feedback handler 104 is generally responsible for receiving or storing machine learning model or other automated feedback (e.g., and not user feedback) for the variants generated by the variation generator 102. For example, the feedback handler 104 can store and pass, to a machine learning model, reinforcement learning feedback and/or active learning feedback, which is described in more detail below.

In some embodiments, the enhancement component 106 is generally responsible for selecting, from the set of variations generated by the variation generator 102, a variation based on the feedback received by the feedback handler 104. For example, the enhancement component 106 can select the variation that has the highest user feedback Likert scale scores by combining all scores of individual users for each variant.

Alternatively or additionally, in some embodiments, the enhancement component 106 is generally responsible for generating and selecting a new variation (e.g., a variation not included among those produced by the variation generator 102) based on the feedback. For example, using the illustration above, a variation with contrast value A may have been scored equally relative to another variation with contrast value B based on an equal number of likes by users. Accordingly, in some embodiments, the enhancement component 106 averages, sums, or otherwise aggregates (e.g., via a dot product function) these values to generate a new variant AB (a combination of A and B) to select a new variant.

The variation scorer 108 is generally responsible for generating or otherwise deriving a score for a variation according to the feedback received by the feedback handler 104. For example, using the illustration above, several users may have been presented with a variant with Likert scale ratings 1 through 5, which respectively indicates "Awful," "Bad," "Okay," "Good," "Great." In some embodiments, in order to compute the feedback score for each variation, the variation scorer 108 sums each numerical rating integer for a given image. For example, if there are 10 users that all give a rating of 5 for an image, the variation scorer 108 performs a linear operation, such as addition or multiplication to give an overall score of 50 (5 ratings multiplied by 10 users).

In some instances, when feedback is implicit, the variation scorer 108 may use different computational functions relative to explicit feedback. For example, the variation scorer 108 may programmatically call the feedback handler 104 in order to read a data structure and return a mapped value for the specific user feedback type. For example, the data structure, such as a hash map or lookup table (e.g., in storage 105) may have several key entries indicating user feedback type such as "purchase," "social media share," "click," "view." Each key entry may have a corresponding value representing the user feedback score value, such as 5 (for "purchase"), 4 (for "social media share"), 3 (for "click"), and 2 (for "view"). Accordingly, the variation scorer 108 may receive an indication, such as in TCP/IP metadata, the specific user input (e.g., a "click") and then send the specific user input by calling the feedback handler 104. The feedback handler 104 may then match the "click" user input to the key "click" in the key entry in the data structure. The feedback handler 108 may then map the "click" key to the value of 3, which represents the user feedback score and then return this result back to the variation scorer 108. Accordingly, because users are not directly providing explicit user feedback in some instances, particular embodiments utilize data structures with pre-defined feedback score values based on the particular type of user input a user provided. This is because certain user input may be more indicative of user interest relative to others. For example, if a user directly purchased a video or image (or even a product that has a variation in an item listing), this may, for example, be more indicative of the user liking the variation as opposed to a user just viewing a web page that happens to contain a variation.

In some embodiments, the enhancement component 106 (and/or the variation generator 102) represents or uses one or more models (e.g., machine learning models) to find the variation via the variation selector 112. For example, in some embodiments, the enhancement component 106 uses Bayesian Optimization (BO) algorithms to find the optimal variation, as described herein. In alternative or additional embodiments, the enhancement component 106 uses a reinforcement learning model to find the optimal variation. In reinforcement learning, an agent finds the best possible path to reach a reward (e.g., a certain score or amount of points). In some embodiments, the reward is given for maximizing a feedback score or more precisely, generating variants whose parameter values as associated with feedback scores that meet (e.g., are over a threshold). For example, after receiving a set of variations, several users may have provided feedback indicative of most of the users only liking a few variations where the parameter values are between 1 and 5 (and not 6-10). Accordingly, in these embodiments, the reinforcement model may only give a reward, such as a score of 10, for the agent generating a variation between the parameter values between 1 and 5. One or more embodiments impose a penalty for any variation whose parameter values fall below or otherwise do not meet a feedback score threshold. For example, using the illustration above, if the model generates variations with parameter values between 6 and 10, there may be a penalty issued, such as a reduction of 4 points from the currently accrued score. Such process continues or iterates until the optimal or suitable variant is generated with the highest feedback score (or score above a threshold) by maximizing the points or other rewards offered by the reinforcement learning model.

In alternative or additional embodiments, the enhancement component 106 uses an active learning model to find the optimal variation. Active learning is a supervised machine learning technique that keeps the size of the training dataset to a minimum by actively selecting the valuable data points (e.g., a variation or variation-feedback score pair). In other words, active learning models choose the specific data it wants to learn from. Active learning is typically used in situations where the amount of data is too large to be labelled (such as images with continuous parameter values) and some priority needs to be made to label the data in an intelligent way.

Active learning minimizes labeling costs while maximizing modeling accuracy. Active learning labels the point whose model uncertainty is the highest. Often, the variance acts as a measure of uncertainty. Various embodiments only know the true value (e.g., a true feedback score) of a function (e.g., an objective function) at a few points. Accordingly, in some embodiments, active learning models use a surrogate model for certain variations. This surrogate should be flexible enough to model the true function. Various embodiments use a Gaussian Process (GP), both because of its flexibility and its ability to give us uncertainty estimates. In some embodiments, the surrogate model starts with a prior of $f(x)f(x)$—in the case of variations, particular embodiments pick a variation or prior assuming that it is smoothly distributed. As particular embodiments evaluate more data points or variations, these embodiments get more data for the surrogate to learn from, updating it according to Bayes' rule.

Various embodiments of active learning keep adding more training points (e.g., variations) and obtain a more certain estimate of $f(x)f(x)$ (e.g., the variation with the highest user feedback score). However, in some embodiments the goal is to minimize the number of evaluations. Thus, particular embodiments choose the next data point intelligently using active learning. Although there are many ways to select points, in some embodiments active learning algorithms pick the most uncertain one. This gives the following procedure for Active Learning: (1) Choose and add the point with the highest uncertainty to the training set (by querying/labeling that point); (2) Train on the new training set; (3) Go to #1 till convergence or budget elapsed. Accordingly, embodiments can estimate the true distribution of user feedback scores in a few iterations. Furthermore, the most uncertain positions are often the farthest points from the current evaluation points. At every iteration, active learning explores the domain to make the estimates better.

The variation selector 112 is generally responsible for selecting the most optimal variation (or at least a suitable variation, such as a particular variation with the feedback score that is the highest in a particular iteration) among those generated by the variation generator 102 based on the user feedback, the corresponding score, and the model or algorithm used. For example, if a BO model is used, the variation selector 112 may select the variation that represents the highest feedback score after all variations, or in other words, the maximum of the objective function by learning a surrogate function, as described in more detail below. Similarly, the active learning model may select a variation by first selecting the most uncertain variations via a surrogate function, to arrive at the most optimal variation. A reinforcement model may select the variation with the highest feedback score based on maximizing rewards and minimizing penalties over many iterations. It is understood that any suitable statistical model or machine learning model can be used by the enhancement component 106, such as a neural network, a regression model, a Random Forest model, a classification model, etc.

The presentation component 116 is generally responsible for presenting content (or causing presentation of content) and related information to a user, such as configuration settings for setting parameter value ranges the model selected via the variation selector 112 as described, for example, with respect to 6A through 6C. Presentation component 116 may comprise one or more applications or services on a user device, across multiple user devices, or in the cloud. For example, in one embodiment, presentation component 116 manages the presentation of content to a user across multiple user devices associated with that user. Based on content logic, device features, and/or other user data, presentation component 116 may determine on which user device(s) content is presented, as well as the context of the presentation, such as how (or in what format and how much content, which can be dependent on the user device or context) it is presented, when it is presented. In particular, in some embodiments, presentation component 116 applies content logic to device features, or sensed user data to determine aspects of content presentation.

In some embodiments, presentation component 116 generates user interface features associated with generated variations. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 116 can cause presentation of a list of ranked variations according to user feedback scores. The presentation component 120 can additionally or alternatively cause presentation of other contextual data or metadata, such as timestamps of when user feedback took place.

The consumer application 118 generally refers to one or more computer applications or services, such as online/ cloud applications or locally stored apps that consume or utilize the variations generated or selected by system 100. In particular, the consumer application 118 may be an application that uses a deployed model to determine a most optimal variation (e.g., the variation selected by the variation selector 112) for a given input image provided by a user, among other functionality. An example of consumer application 118 may be or include, without limitation, media editing software, computer applications or services for facilitating meetings or communications, social media applications, email, messaging, chat, or the like.

Figure 2:
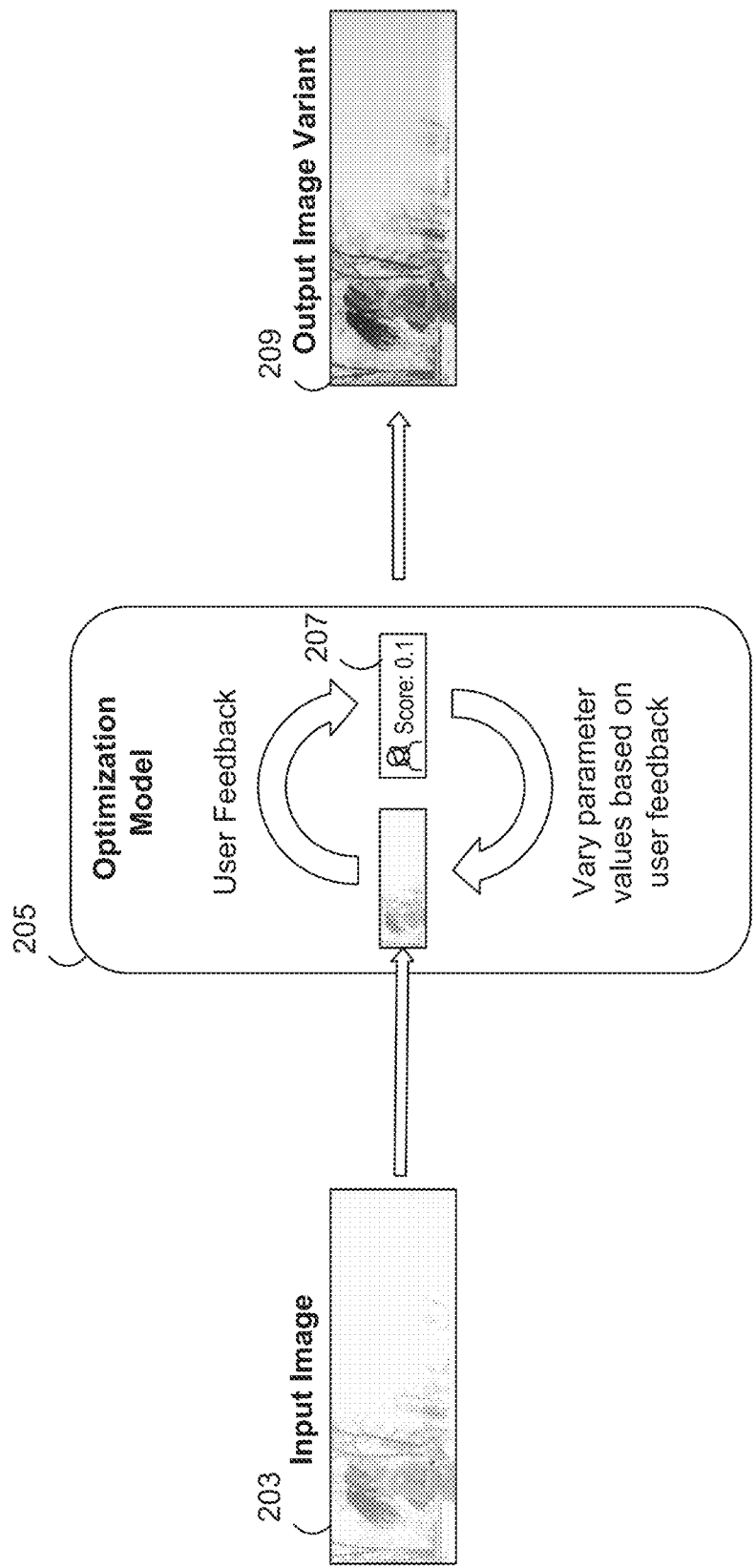
FIG. 2 is a schematic diagram illustrating high level functionality for deriving an optimized output image variant from an input image using an optimization model, according to some embodiments.

FIG. 2 is a schematic diagram illustrating high level functionality for deriving an optimized output image variant from an input image using an optimization model, according to some embodiments. For FIG. 2, given the input image 203, the goal is to generate the optimal variation (i.e., the output image variation 209) of the input image. In particular embodiments, variations are generated by adjusting one or more image parameter values of the input image 203. At a first time the input image 203 is caused to be rendered (e.g., via the feedback handler 104) to a user, such as via a Likert scale test, at a web page, or the like. The input image 203 may represent a single media content item with specific contrast, sharpness, saturation, and/or other parameter values. Subsequently, the user explicitly rates the input image 203 or inputs activity (e.g., clicks, views, purchases) associated with the input image 203 as implicit feedback, as described with respect to the feedback handler 104. In response to receiving the user feedback, the score 207 is generated, such as described with respect to the variation scorer 108. For example, the user may have rated the input image 203 as "bad," which may cause the variation scorer 108 to generate a low score for the particular input image 203 and its corresponding parameter values.

Based on the score 207, the optimization model 205 continues the loop to generate additional variants for which additional user feedback is made and corresponding scores until the optimum variant (i.e., the output image variant 209) is found. For example, the optimization model 205 my determine that 90% of the highest scores were for variations that included particular saturation value X and contrast value Y over 95% of the time, even though sharpness values and vibrance values changed considerably. Accordingly, the optimization model 205 may subsequently generate a next set of variations with saturation value X, contrast value Y (because users like variations with these values over 95% of the time) and sharpness values between a range of A through E and vibrance values between F through H. User may then provide feedback on these newly generated variations. For example the user may rate or perform input on variations over a threshold (e.g., "like") whose sharpness values were between A and B and whose vibrance values were G 90% of the time. After the second set of scores has been responsively generated, the optimization model 205 may then generate another variant (e.g., the output image variant 209) or set of variants that contain saturation value X, contrast value Y (learned from the first iteration), sharpness value A (because most users liked variants with this sharpness value), and vibrance value G (e.g., because all user liked variants with this exact vibrance value). In some embodiments, the percentages indicated above represent thresholds (either predefined or not) set by model such that when those thresholds are exceeded or otherwise met, variations for corresponding parameter values are generated. The quantity of loops, iterations, or variations generated depends on the model or algorithm used. For example, using BO algorithms, several sets of variations may be generated for several iterations until a surrogate function is learned such that the maximum of the objective function is discovered (e.g., the output image variant 209), which is described in more detail below. In this way, the BO model finds the output image variant 209 (the maximum of the objective function) in a small number of observations or iterations.

In some embodiments, the optimization model 205 represents a model that has already been optimized (e.g., trained) on the user feedback (e.g., via minimizing a loss to some acceptable level and testing the model). In this way, particular embodiments can essentially run the input image 203 through the optimization model 205 and quickly determine the most likely variation to produce the output image variation 209. For example, once the input image 203 is fed into the optimization model 205, it may convert the input image 203 into a set of vectors representing the actual content and objects (representing real world objects) located in the input image 203 and/or the specific parameter values, such as brightness, sharpness, and the like. Responsively, the optimization model 205 may then detect the specific objects (e.g., via a CNN or object detection model), the background, and/or foreground (e.g., via panoptic segmentation) and then map the objects to other trained variations and images by, for example, determining which feature vector, representing a training image, is closest in distance (e.g., Euclidian distance, Hamming distance, or Cosine distance) to the feature vector representing the input image 203. Other comparison methods can be done, such as by comparing hashes representing particular images (e.g., their object and parameter values). Based on a first feature vector being closest in distance to the feature vector representing the input image 203 (e.g., meaning that the two images have similar content), particular embodiments then map the first feature vector (e.g., via a lookup table) to its most optimal or suitable variation (e.g., the variation selected by the variation selector 112). Responsively, the optimization model 205 generates the output image variation 209 by changing the input image 203's parameter values to match the optimal variation associated with the first feature vector.

Figure 3:
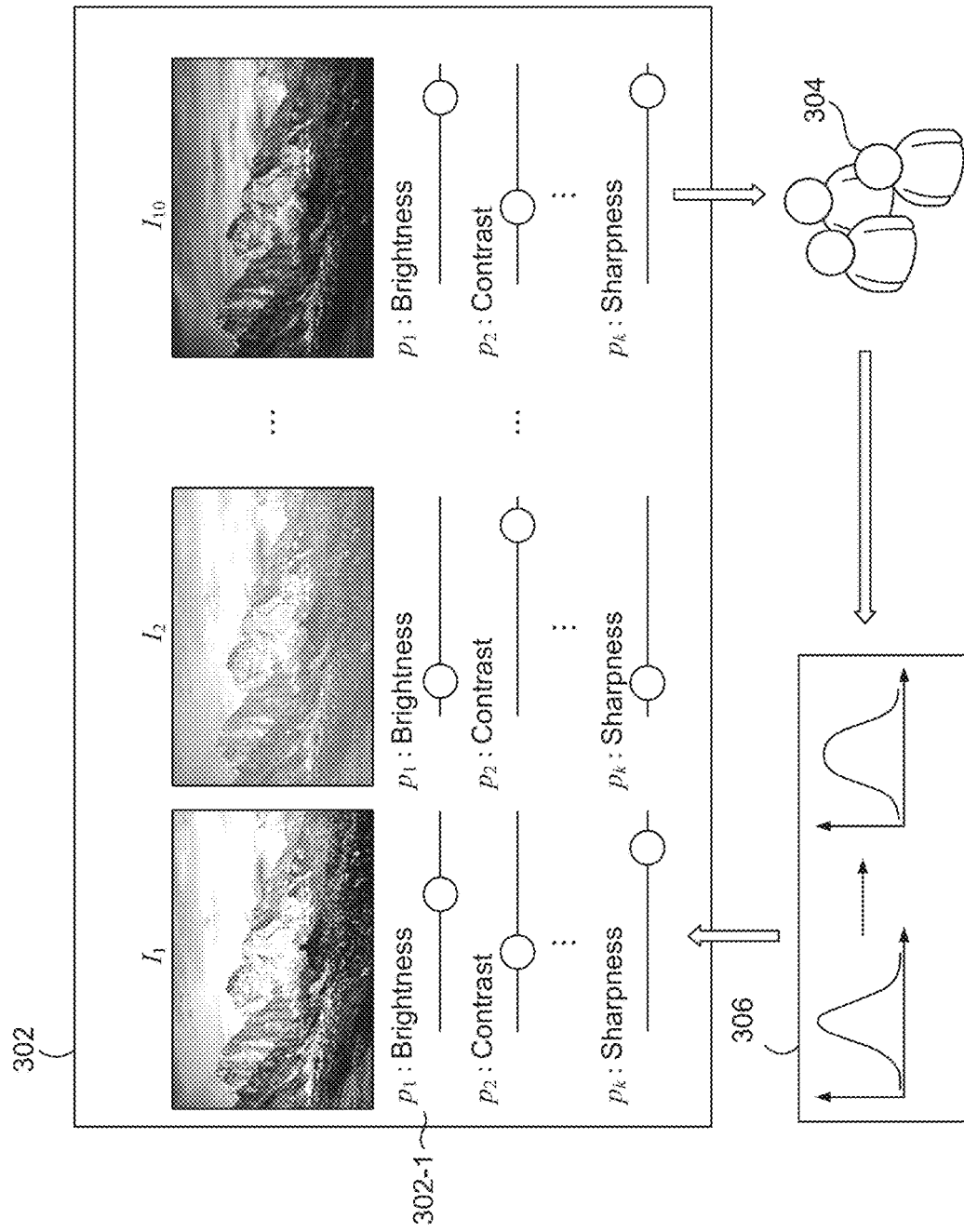
FIG. 3 is a schematic diagram illustrating high level functionality for determining an optimal or suitable image variation using a BO model, according to some embodiments.

FIG. 3 is a schematic diagram illustrating high level functionality for determining an optimal or suitable image variation using a BO model, according to some embodiments. In some embodiments, the BO model includes or represents the optimization model 205 of FIG. 2. FIG. 3 specifically represents an iteration of the Bayesian Optimization loop. At a first time or iteration, the BO model samples parameters (p) for 10 variations (I) of an input image. For example, the BO model may use random sampling or otherwise auto-generate 10 variations as represented by the set of variations 302. As illustrated by 302, each variation contains different brightness, contrast and sharpness values (as indicated by the sliding scale elements, such as 302-1). It is understood that the variations 302 can alternatively or additionally include any type or quantity of parameter values, such as saturation, and vibrance.

"Brightness" indicates how dark the pixels of a content item is. "Contrast" indicates the degree of difference between different elements/objects in an image, which are typically represented by color contrast or tonal contrast. For example, black and white have high contrast, whereas red and gray have low contrast. And combining cool colors (e.g., blue and purple) with warm colors (e.g., red) indicates high contrast, whereas combining all cool colors together results in low contrast. "Sharpness" indicates the clarity in a content item, which can be in terms of focus and/or contrast. When a content item is sharp, it appears clear with detail, contrast, and texture. Whereas content items that lack sharpness appear blurry or lack detail. "Saturation" refers to the intensity of a color. The higher the saturation of a color, the more vivid it is. The lower the saturation is, the closer it is to gray. "Vibrance" is a process that increases the intensity of more muted colors and leaves well-saturated colors alone. It is understood that these parameters are representative only and more or fewer parameters can exist, such as resolution, exposure, color, and the like.

For each of these parameters in FIG. 3, there is a continuous or infinite amount of values that can be set. This is because the pixel values can be changed to any intensity value via filtering or similar functionality. In some embodiments, variations are generated or variation parameter values are set by only changing pixel intensity, but not pixel position (e.g., such as through warping) relative to an input image or content item. Alternatively, and as described in more detail below, variations can be generated where the variations contain pixels representing objects that were not included in an input image/content item or have otherwise changed position from one to the other.

Continuing with FIG. 3, some embodiments can receive user input and requests to adjust parameter values of the variations 302 and responsively change the parameter values based on the user input. For example, some embodiments can receive an indication that a user has adjusted the sliding scale 302-1 so that the brightness of the corresponding image ($I_1$) is set according to the adjustment made at the sliding scale 302-1.

In response to generating the variations 302, particular embodiments cause the variations 302 to be displayed or otherwise provided to devices associated with users. For example, particular embodiments can send, over the network(s) 110, the variations 302 to a web server, application server, and/or directly to a user device so that one or more users can: upload, at a web application, the variations 302 (e.g., along with a Likert scale test), engage in user activity at a web or app page that includes one or more of the variations 302, and/or download, to a user device, one or more of the variations 302. Any suitable communication channel can be used, such as Short Message Service (SMS) texts, email, chat, etc. Subsequent to such rendering of the variations 302 to users, the users provide the "audience feedback 304." For example, one or more users can provide explicit feedback by rating one or more of the variations 302 according to the aesthetic quality and/or provide implicit feedback by clicking, viewing, sharing, or otherwise interacting with a page that includes one or more of the variations 302, as described with respect to the feedback handler 104. The devices associated with the users then transmit (e.g., over the network(s) 110) indications of the user feedback back to other devices, such as the server 1210 of FIG. 12. The time at which these devices transmit the user feedback may be event or time-based. For example of an event based triggering action, in response to receiving an indication that a user has selected a "submit" button of a Likert test, those devices may transmit and particular embodiments may receive the results of the test. In situations where the user feedback is implicit, in some embodiments, user activity logs or other engagement may be derived at every X time interval, such as 20 minutes straight at the top of every hour, every 5 minutes, every hour, or the like.

In response to receiving the audience feedback 304, some embodiments update a prior belief model 306 (i.e., a surrogate model) of A BO model, which ends the first iteration. A "belief model" uses Bayes Theorem and is used to quantify the beliefs about an unknown objective function given samples (e.g., the variations 302) from the domain (millions of variations) and their evaluation via the objective function and posterior. The "posterior" captures the updated beliefs about the unknown objective function. In other words, the objective function is estimated with a surrogate function (e.g., a Gaussian process model) (also referred to as a "response surface"). Accordingly, in response to receiving the audience feedback 304, particular embodiments modify the surrogate model to more closely conform to the unknown objective function or reduce the distance between the surrogate function and the objective function. For the first iteration (and each iteration thereafter), some embodiments, additionally detect or mark the variation that has the highest score according to the user feedback, as described in more detail below.

In response to updating the belief model 306, various embodiments start a new iteration in the loop by using an acquisition function to generate additional variations (with different parameters relative to 302). In these embodiments, these new variations are carefully selected via the acquisition function in order to minimize the distance to the objective evaluated at the maximum. This process or loop continues (i.e., audience feedback 304, updating belief model 306, and generating new variants) until the maximum or optimal variant (e.g., the output image 209) is found. In some embodiments, the quantity of iterations performed depend on the iteration where the surrogate function closely fits or models the objective function based on meeting some distance or value threshold. In some embodiments, based on determining that there will be no more iterations, the highest scoring variation for each iteration is then compared and the highest score is then selected as the content item (e.g., the variant output image variant 209) to render to a user. The specifics of the BO model are described in more detail below.

In some embodiments, variations sampled or generated via an acquisition function indicate representative major turning points, milestones, or trend breaks (e.g., user feedback score thresholds) in the objective function but do not include every single data point (e.g., a variant with a combination of different parameter values and corresponding feedback scores) of an objective function. For example, a single data point produced by the acquisition function may account for several data points of a ground truth objective function that are within a threshold distance or feedback score threshold of each other (e.g., all are within a high saturation value range of each other). In this way, the ground truth does not have to be analyzed in order to make predictions for the most optimal variant. Rather, only representative data points of the objective function are analyzed to learn a surrogate function in order to find or select a suitable variant. Such suitable variant, such as a particular image with specific contrast, saturation, and brightness parameter values with the highest user feedback score can then be caused to be presented to users for consumption or sharing.

The following text describes mathematical notation of a BO model, according to some embodiments. Given any multimedia content (such as images or videos), say M, the overall goal in some embodiments is to produce the optimum version of $\mathcal{M}$, say $\mathcal{M}*$ (or I*) with respect to a given application. Various embodiments optimize an image to generate its best variation based on a set of specific image parameter values. More specifically, given an input image I, particular embodiments generate variations of I by changing k continuous parameters $p_1, p_2, \ldots, P_k$, which range between 0 and 1. Accordingly, in certain embodiments the goal then is to find the optimum variation I*, and the corresponding parameter values $p_1*, p_2*, \ldots, p_k*$. Various embodiments use various parameters (k=2, 3, 5), such as vibrance, saturation, brightness, contrast, color, and sharpness.

The goal of Bayesian optimization (BO) is to find the maximum of an unknown black-box objective function g, which is costly (e.g., computationally). Because g is a costly function, particular embodiments refrain from sampling at many points (e.g. via grid search, random search or numeric gradient estimation). BO is an iterative approach of finding the optimal solution to such optimization problems in as few steps as possible. More formally, this can be framed as solving the following optimization, $$x^* = \underset{x}{\mathrm{argmax}} g(x).$$

To solve this problem, particular embodiments first choose a surrogate model $\hat{g}$ for modeling the true function g and define its prior distribution. Following this, some embodiments run multiple such iterations (e.g., multiple iterations of FIG. 3) of a BO loop. Assume t−1 iterations of the BO loop are over and $D_{1:t-1}=(x_1,y_1), \ldots, (x_{t-1}, y_{t-1})$ are the samples that have been used to evaluate g so far. An iteration t involves the following steps—(1) Optimize an acquisition function a to find the next sampling point $x_t$, $x_t$=arg max$_x$ $\alpha(x \mathcal{D}_{1:t-1})$; (2) Evaluate g on this newly sampled point, $y_t$=g($x_t$); and (3) add the new sample $(x_t, y_t)$ to previous samples $D_{1:t}=D_{1:t-1}(x_t,y_t)$ and update the surrogate model $\hat{g}$.

Various embodiments of the present disclosure use the BO algorithm to select optimal variations, as indicated in by the pseudocode indicated in the table below:

| Algorithm 1: The algorithm for generating an optimal variant of an input image I. |
|---|
| Input : Input image I, fixed budget of iterations B. |
| Output : The optimal variant I* |
| 1  Initialize prior belief (surrogate) model, $\hat{g}$. |
| 2  Initialize I* as null. |
| 3  for j ∈ [1, B] do |
| 4  \|   Generate n image variants using $p_1*, p_2*, \ldots, p_k*$ values |
| 5  \|   Use f = g($p_1*, p_{1k}*$) to obtain user feedback on the image |
| \|   variants. |
| 6  \|   Update I* as the image variant with the highest |
| \|     feedback value. |
| 7  \|   Update $\hat{g}$ based on feedback. |

| Algorithm 1: The algorithm for generating an optimal variant of an input image I. |
|---|
| 8  \|   Use EI to sample $p_1*, p_2*, \ldots, p_k*$ for next iteration. |
| 9  end |
| 10  return I* |

This pseudocode sequence indicates that for each iteration (j), generate a particular quantity of variations p. Responsively, particular embodiments receive user feedback on these generated images. In response to receiving user feedback, particular embodiments score a particular image variation (I*) with the highest user feedback value. Responsively, embodiments update the surrogate model based on the score (and user feedback). Particular embodiments then use an Expected Improvement (EI) acquisition function (or any other suitable acquisition function) to sample or generate new variations with particular parameter values to start the next iteration of the loop. After the iterations are complete (or after each iteration), a coding function then returns the variation with the highest score according to the user feedback, which closes the loop.

The following represents notation embodiments for the BO algorithm. Given an input image I, each image variant is defined using a k-dimensional vector $p=[p_1, p_2, \ldots, p_k]^\dagger$. In some embodiments, these parameters are image enhancement parameters that are used for editing or enhancing images. Particular embodiments learn and optimize the objective function g: p→f, where f is the feedback for every image variant characterized by p. At the $j^{th}$ iteration, we generate n variants of I, denoted as $I_1^j, I_2^j \ldots I_n^j$, using their corresponding parameter values, $p_i^j$, where i=1, 2, . . . , n.

Before the BO algorithm is initiated, particular embodiments define the surrogate (prior belief) model. Since the objective function g is expensive to evaluate, a surrogate model $\hat{g}$, which is known to the user and easy to evaluate, is used in place of g. The surrogate model $\hat{g}$ is initialized using a prior belief on g based on domain knowledge about g. At each iteration (from a fixed budget B), particular embodiments draw a sample from the input space, evaluate it using g, and update the prior belief of the surrogate model $\hat{g}$. The prediction accuracy (to predict the optimal variation) of the surrogate model improves with each iteration of update of $\hat{g}$.

Some embodiments use a Gaussian Processes (GPs) to make the surrogate model, as they are easy to model and are suitable for estimating unknown quantities. Particular embodiments thus define a surrogate model $\hat{g}$ as a Gaussian Process (GP) and initialize the prior belief model using zero mean (μ=0) and the Matern co-variance matrix, K:

$$\hat{g} = \mathcal{N}(0,K).$$

The following describes how variations are sampled before they are generated, according to some embodiments. In some embodiments, sampling the input space is done using acquisition functions that balance between exploration and exploitation. In other words, acquisition functions aim to sample points where the objective function value (exploitation) as well as the uncertainty (exploration) is high. An example of a simple acquisition function is the Expected Improvement (EI), which chooses the next point (or variation) where the function value is expected to be greater than the previous value. In other words, EI tries to select the data point(s) or variation(s) that minimize the distance to the objective evaluated at the maximum. It is understood that any alternative suitable acquisition function can be used, such as Probability of Improvement (PI), or Lower Confidence Bound (LCB). The EI at the $j^{th}$ iteration is defined as follows, $$EI^j(p) := \mathbb{E}^j[\hat{g}(p) - \hat{g}^*].$$

Particular embodiments use the EI acquisition function to select the n sets of parameter values, $p_1^{j+1}, p_2^{j+1}, \ldots, p_n^{j+1}$ for the next iteration at j+1. Then, $$p^{j+1} = \arg\max EI^j p^j.$$

The following describes how image variants are generated, according to some embodiments. Based on the parameter values for obtained sampled using EI, for every iteration particular embodiments generate the corresponding image variants, $I_1^j, \ldots, I_n^j$. Some embodiments use the OpenCV library and Pillow library in Python to apply image enhancement operations on the input image I to obtain the corresponding image variants, $$I_1^j = \varphi(I(p_1^j)) \ldots I_n^j = \varphi(I(p_n^j)),$$

where $\varphi$ is an image enhancement operator.

The following describes the feedback function, according to some embodiments. The last step of Bayesian optimization is to evaluate the expensive function g on the sampled points. Particular embodiments obtain feedback on the image variants generated $I_1^j, \ldots, I_n^j$ on the $j^{th}$ iteration. In some embodiments, the feedback obtained from human participants is a score in the range of 0-5 on every variant of the iteration. For automated feedback, some embodiments use an automated image assessment scorer as the feedback function:

$$f_1^j = g(I_1^j), \ldots, f_n^j = g(I_n^j),$$

These n new data points are then used to update our belief model $\hat{g}$.

Figures 4, 5:
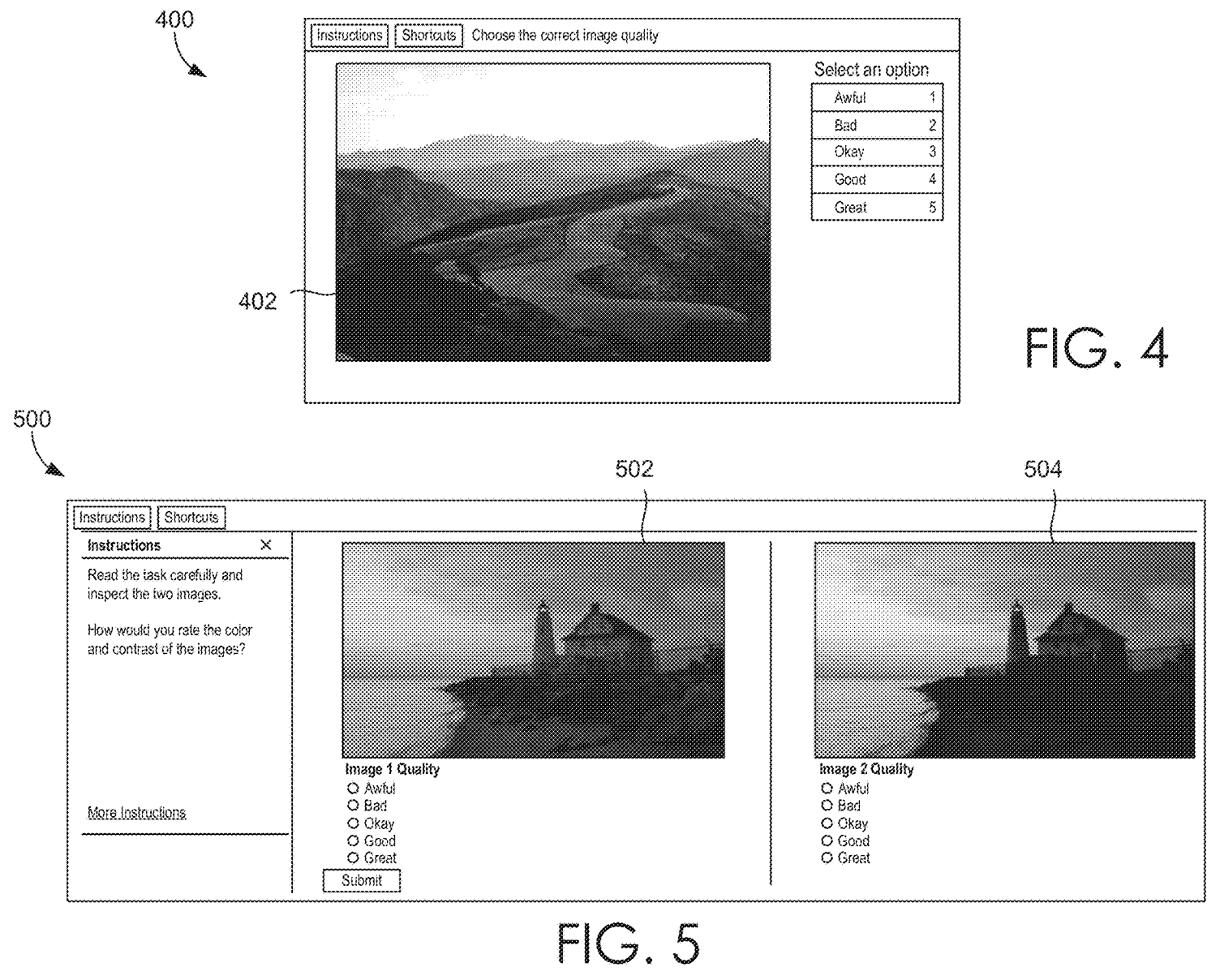

Returning now to the figures, FIG. 4 is a screenshot 400 of an example user interface used to derive explicit user feedback, according to some embodiments. In some embodiments, this is the user feedback handled by the feedback handler 104 of FIG. 1. In the screenshot 400, participants are asked to rate the image variation 402 on a 5-point Likert scale ("Awful," "Bad," "Okay," "Good," and "Great,") with respective integer values 1 through 5.

In various embodiments, the image variation 402 represents I, in order to obtain I*. In some aspects, human participants are recruited (e.g., from AMAZON Mechanical Turk (AMT) to provide feedback in each image variation generated by the optimization model 205 or enhancement component 106. Particular embodiments thus generate, for example, 10 variations and collect scores from 10 users for each image variation. Particular embodiments subsequently average the scores from all of the users for each image variation and uses these as feedback to run an iteration on the model. For example, two users may have scored the image variation 402 as "Great" and 1 user may have scored the image variation 402 as "Bad." Accordingly, their corresponding feedback scores are averaged (5+5+2/3) to arrive at the average feedback score of 4 (e.g. as determined by the variation scorer 106). For a next iteration, various embodiments responsively generate another set of variations (e.g., another 10 variations) using an acquisition function and repeat the steps described above with respect to averaging the scores. Some embodiments terminate these user feedback tests after some variation quantity of threshold is met, such as 100 variations.

FIG. 5 is a screenshot 500 of an example user interface used to derive explicit user feedback, according to some embodiments. In some embodiments, this is the user feedback handled by the feedback handler 104 of FIG. 1. In the screenshot 500, participants are asked to rate the image variation 502 and image variation 504 on a 5-point Likert scale ("Awful," "Bad," "Okay," "Good," and "Great,") with respective integer values 1 through 5. In these embodiments, participant ratings are normalized by showing them an additional original image (e.g., an input image), where the participants do not know which image is the original image.

One drawback of human feedback is that different participants may have different notions of what "optimal" or any of the Likert scale ratings (e.g., "Good" or "Great") means, thereby affecting their feedback scores. For example, participants with a higher bar for quality may provide lower than average feedback for an average image while a more lenient participant may provide higher feedback. To normalize these scores, particular embodiments render two images—502 and 504—, one of which is the original image and the other is the variation. In other words, particular embodiments calibrate each participant's feedback on the variation based on how they score the original image. In some embodiments, participants are not notified which of the two images 502 and 504 is the original image.

Similar to FIG. 4, particular embodiments show participants two images 502 and 504 side-by-side and ask them to rate the images based on a scale of 1-5. Some embodiments, compute the ratio between the scores of the two images 502 and 504 to understand how "better off" (>1) or "worse off" (<1) the user finds the image variant compared to the original image. Some embodiments generate a particular quantity (e.g., 10) image variations and collect scores from a particular amount (e.g., 10) users for each image variant. Some embodiments (e.g., the variation scorer 108) then average the ratios for the images and use these as feedback to run an iteration at the model 205 or the enhancement component 106. Some embodiments terminate the process after a specific variation generation threshold (e.g., 100 variations have been generated) has been met.

Figure 6A:
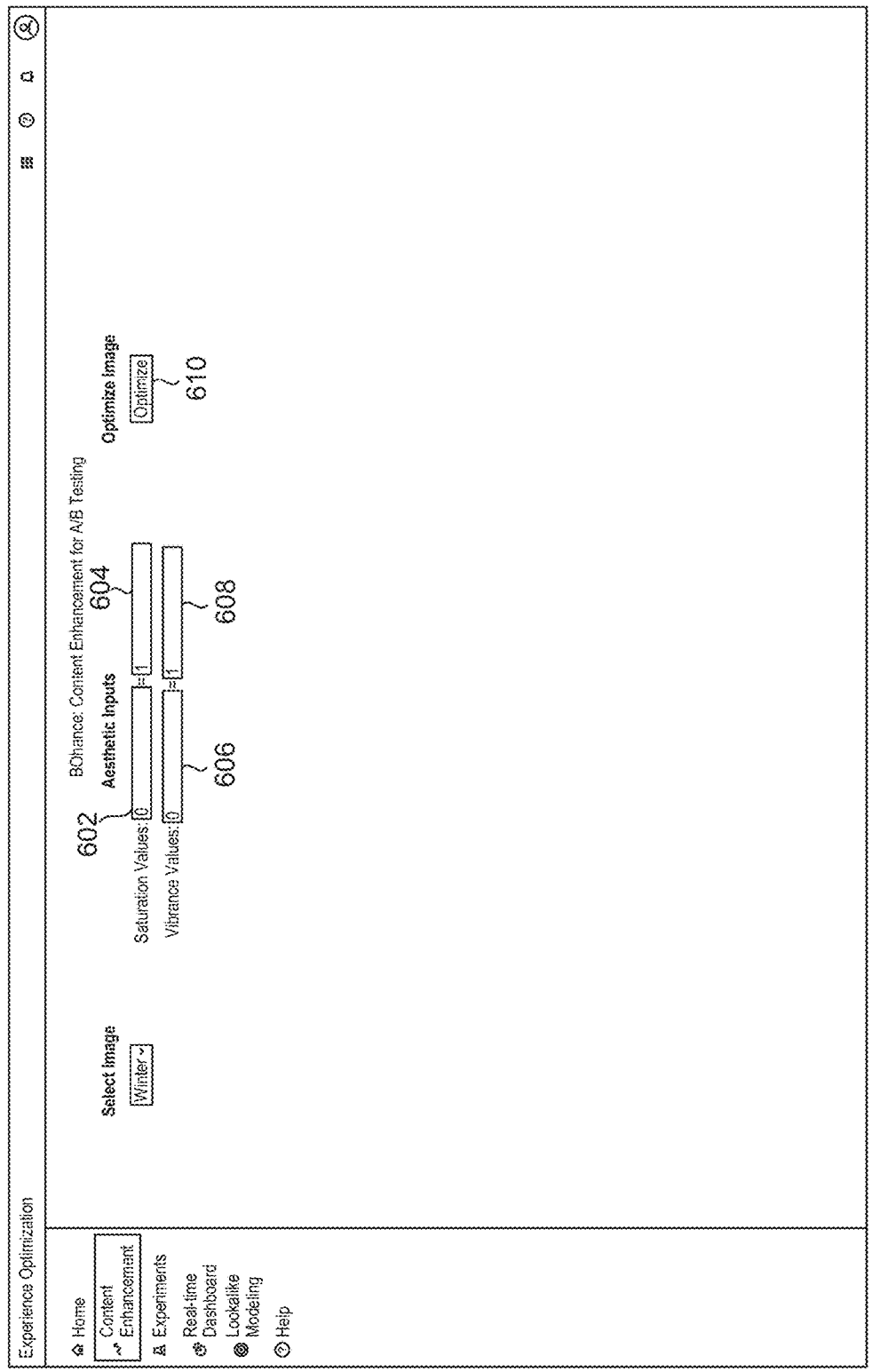
FIG. 6A is a screenshot of an example user interface for setting a parameter value range before variations are generated, according to some embodiments.
Figure 6B:
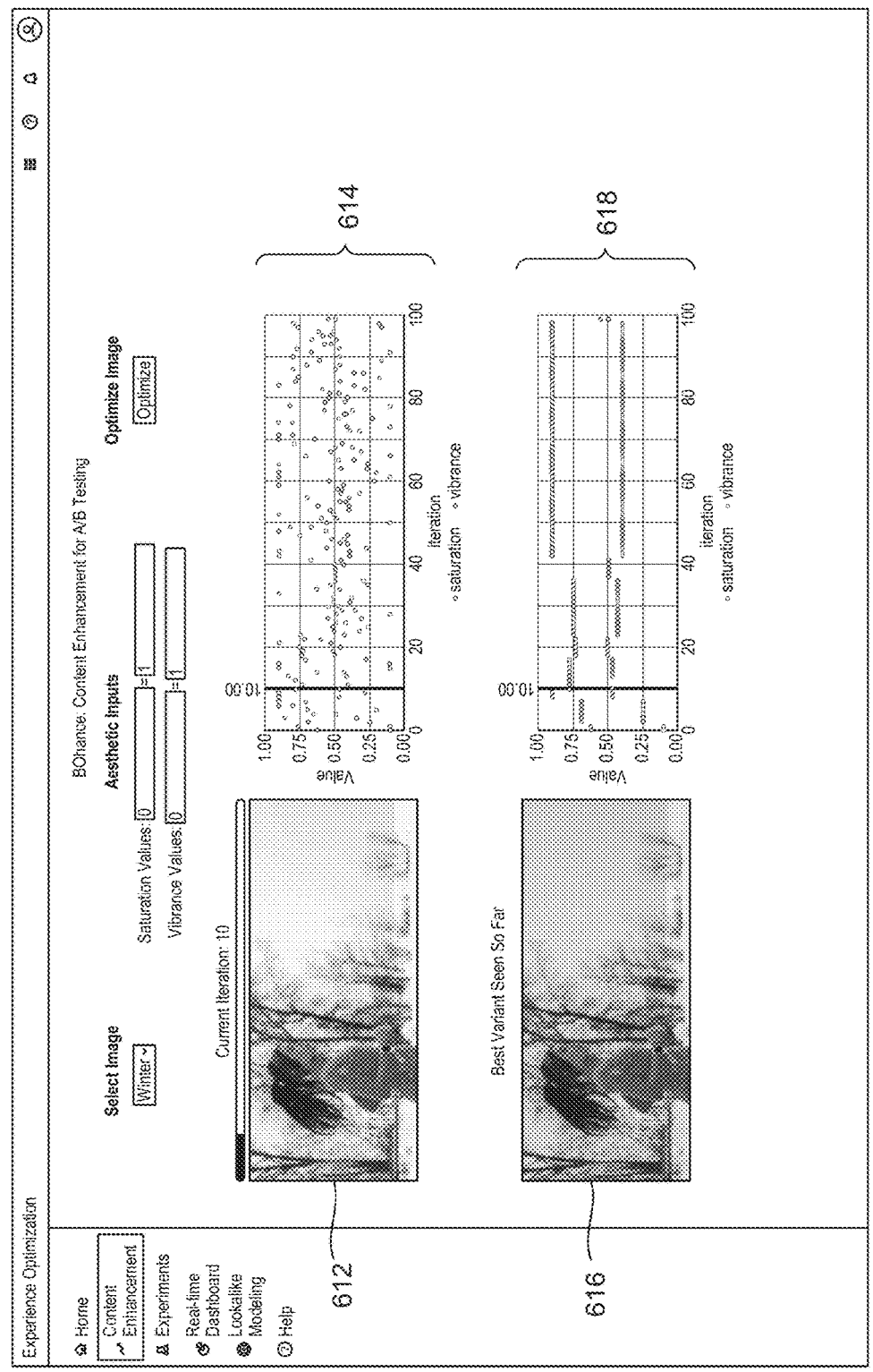
FIG. 6B is a screenshot of an example user interface illustrating how an optimization model chooses an optimal variation at a current iteration of the input image selected in FIG. 6A, according to some embodiments.
Figure 6C:
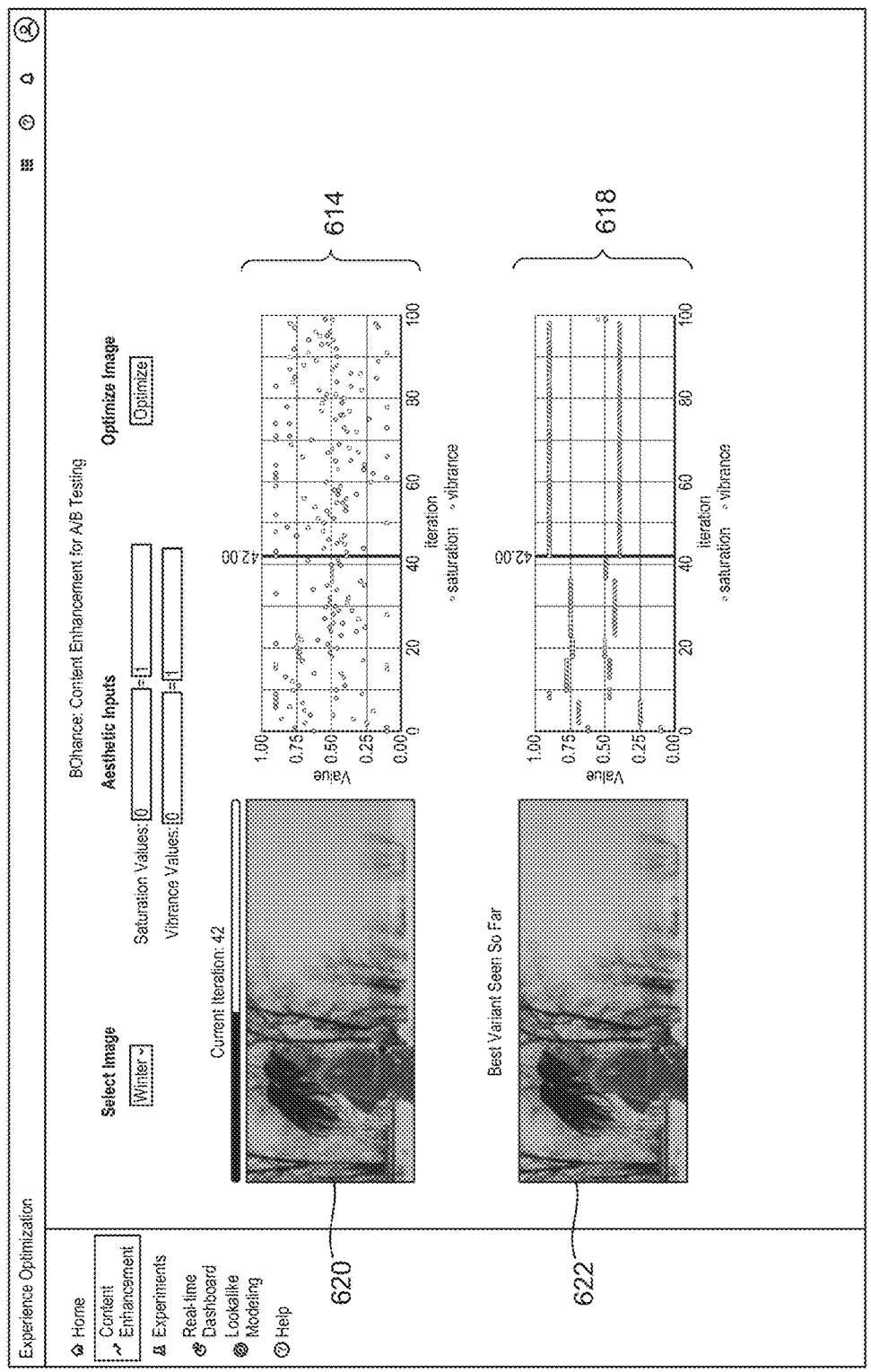
FIG. 6C is a screenshot of an example user interface illustrating a later iteration relative to FIG. 6B and how an optimization model chooses a final optimal variation of the input image selected at FIG. 6A, according to some embodiments.

FIG. 6A is a screenshot 600 of an example user interface for setting a parameter value range before variations are generated, according to some embodiments. In some embodiments, FIG. 6A through FIG. 7C represent what is produced by the presentation component 116 and/o the consumer application. In some embodiments, FIG. 6A through 6C represent a consumer application (e.g., image editing software) after an associated optimization model has been optimized (e.g., trained). Alternatively, in some embodiments, FIG. 6A through 6C represent a consumer application that is used to optimize (e.g., train, fine-tune, or test) an optimization model.

As described herein, in some embodiments users may manually set or configure parameter value settings before an optimization model performs its functionality. This reduces the search space for optimization and allows the optimal variation to more closely resemble human aesthetic preferences. For example, images that are substantially dark or white may be discarded before optimization since no user would desire images with these extreme pixel values since the user would not be able to view any content in the image. Accordingly, users may set parameter value ranges.

As illustrated in the screenshot 600, particular embodiments receive an indication that the user has selected a "winter" input image and set a saturation value between 0 and 1 based on user input of the values 0 and 1 in the respective fields 602 and 604 (meaning that the optimization model will only generate variations of the winter image with saturation values between 0 and 1). Likewise, particular embodiments receive an indication that the user has set vibrance values between 0 and 1 based on user input of the values 0 and 1 in the respective fields 606 and 608. Subsequent to the user inputting these values, the user can then optimize the "winter" input image via selection of the "optimize" button 610.

FIG. 6B is a screenshot 600-1 of an example user interface illustrating how an optimization model chooses an optimal variation at a current iteration of the input image (i.e., the "winter" input image), selected in FIG. 6A, according to some embodiments. In some embodiments, the screenshots 600-1 and 600-2 represent the output presentation functionality (e.g., as produced by the presentation component 116) in response to the enhancement component 106 (or optimization model) and/or the optimization model 810 performing its functionality, as described herein. As illustrated in the screenshot 600-1, the optimization model is currently operating at the $10^{th}$ iteration. The image variation 612 indicates what the parameter values appear like at the current iteration 10. The image variation 616 indicates what the most "optimal" or "best" variation appears like after 10 iterations (or for the current iteration 10). In some embodiments, after the second iteration and each subsequent iteration, the prior iteration and its feedback score is compared to the current iteration value and its feedback score and the score that is the highest represents the "Best Variant Seen so Far" and the lower of the two scores are discarded. This loop continues until there are no more iterations and the highest score is selected as the most optimal or best variation (e.g., the maximum of the objective function). The graphs 614 and 618 illustrate the values of the saturation and vibrance that has been generated or sampled for the current iteration 10.

FIG. 6C is a screenshot 600-2 of an example user interface illustrating a later iteration relative to FIG. 6B and how an optimization model chooses a final optimal variation of the input image selected at FIG. 6A, according to some embodiments. As illustrated in FIG. 6C, the current iteration is 42, which is several iterations later than iteration 10 of FIG. 6B. The image variation 620 represents how the parameter values appear at the current iteration 42. In some embodiments, the image variation 622 represents the most optimal or best (e.g., the maximum of an objective function) variation of the "winter" input image. In other embodiments, the image variation 622 represents the most optimal or best for the current iteration 42, which means that the optimization model will perform additional iterations.

Figure 7:
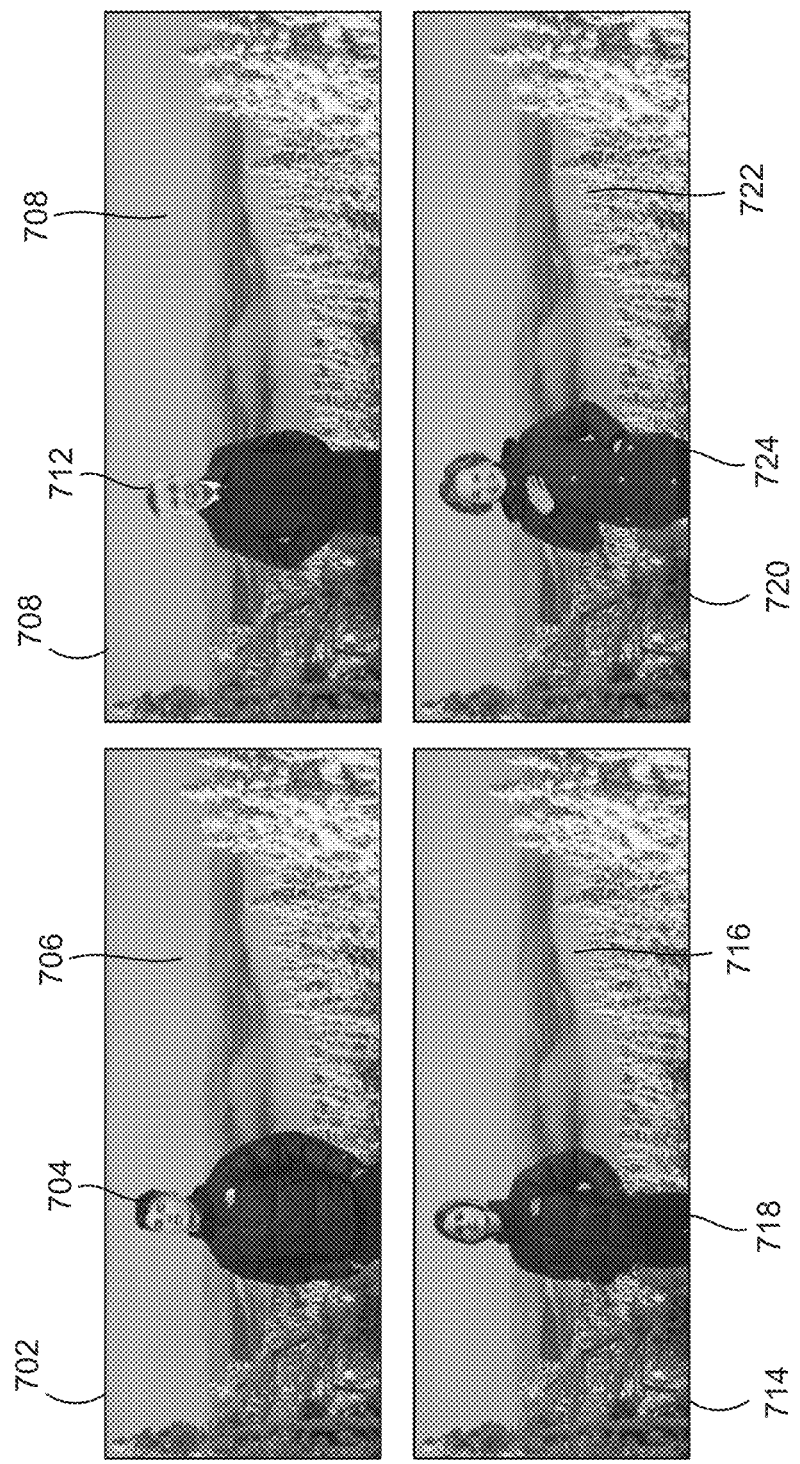
FIG. 7 is a schematic diagram illustrating that variations can be generated by swapping out pixels representing different objects, according to some embodiments.

FIG. 7 is a schematic diagram illustrating that variations can be generated by swapping out pixels representing different objects, according to some embodiments. As described herein, in some embodiments, media content variations can be generated based on changing pixel intensity values that are continuous in nature (e.g., color, sharpness, saturation) even though the pixels themselves are not warped, removed, added, or change position (e.g., as illustrated in FIG. 3). However, according to FIG. 7, some embodiments generate variations whose pixels representing real world objects are alternatively (or additionally) removed and replaced with another set of pixels (and parameter values) representing other real world objects. For example, an input image may be represented by the image 702, which includes the winter background 706 and the younger male FIG. 704. As described herein, particular embodiments may then elicit user feedback on the image 702 and based on the feedback, generate the image variations 708, 714, and/or 720. As illustrated in each of these variations, the winter background is the same as in the input mage. That is, winter background 706, 710, 716, and 722 all contain the exact pixel orientations and positioning (i.e., the "winter" background) and/or the exact same filtering values (e.g., color, saturation, etc., even though these could be different too). However, these variations contain different foreground objects relative to the younger male person 704 in the input image 702. Specifically, in the image variation 708, the older male person 712 has replaced the younger male person 704, in the image variation 714, the younger female person 718 has replaced the younger male person 704, and in the image variation 720, the older female person 724 has replaced the younger male person 704.

As described herein, such as with respect to the feedback handler 104, variations can be generated based on implicit user feedback. In some embodiments, the variations of FIG. 7 are generated based on this implicit feedback. For example, in some embodiments, variations can be generated based on extracting metadata indicating the attributes of users. For instance, as it relates to FIG. 7, particular embodiments can generate variations for jackets that are personalized to the audience's (e.g., users of a particular web application) age and gender. In some embodiments, such attributes are automatically extracted (e.g., from a profile database of a web service), such as when a user registers for a particular service or account and inputs their age and gender (the implicit user feedback). In these embodiments, for example, website traffic may be by users who are predominantly female and less than 20 years old. Accordingly, if a user wishes to test an input image 702 to see which variation is the most optimal, the optimization model may ultimately select the image variation 714 based on the user feedback scores being the highest (i.e., most of the users are female and under 20 years old).

Some embodiments generate variations as illustrated in FIG. 7 by mapping (e.g., via a hash map or database) identifiers representing current pixels or real world objects (e.g., the younger male person 704) to different identifiers representing other pixels or real world objects (e.g., the older male person 712), and then replacing the current pixels with the other pixels. For example, at the user level, if the input image was 702, the younger male 704 can be replaced with the older male 712, the younger female 718, and the older female 724 in different variations. A similar process can occur when the variations are generated based on user feedback. For example, if the initial generated variations include images 714 and 720 (both the older and younger woman) user feedback may include a flag representing "female," and "young." Responsively, these flags can be looked up in a data structure and mapped to its corresponding pixel value object bit or value representing the young female, such that image 720 (the older female) is discarded and the image 714 (the younger female) is indicated as an optimal variation.

Figure 8:
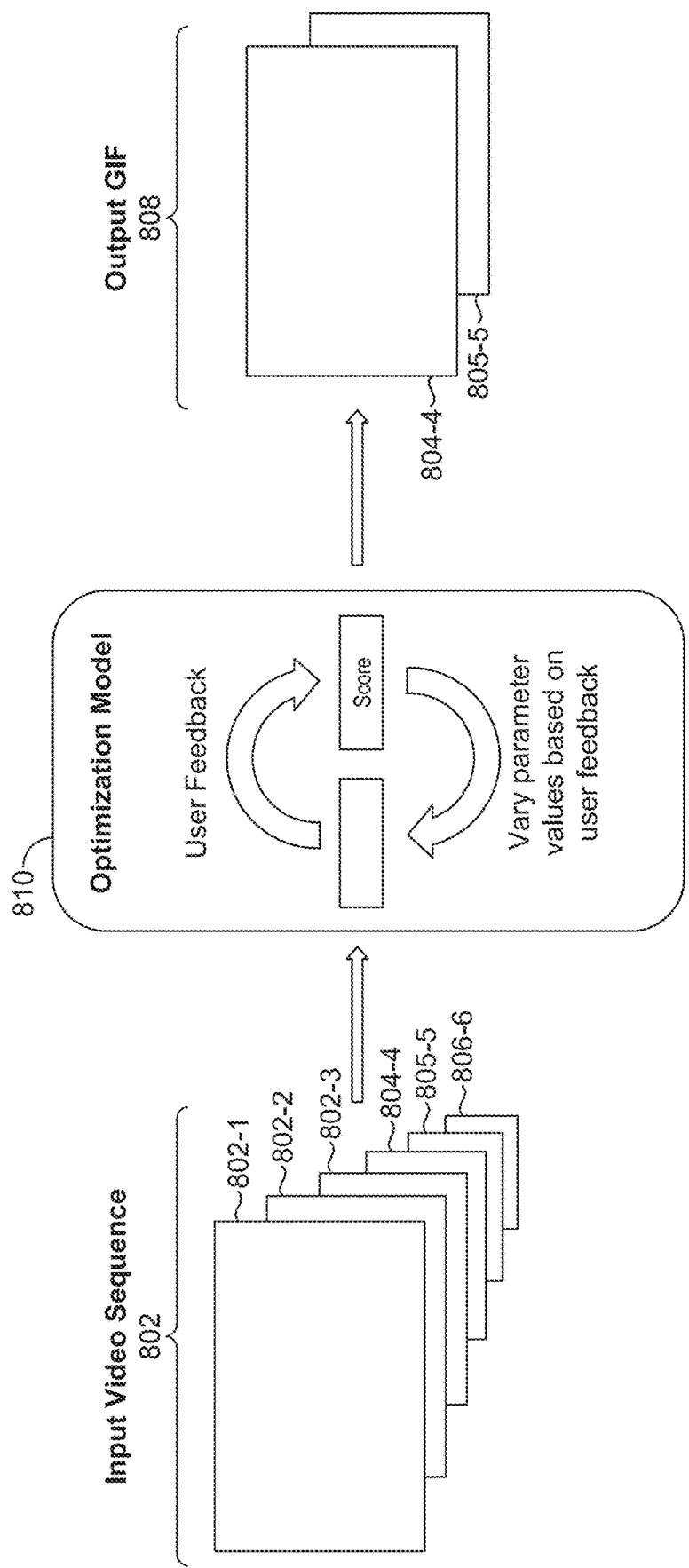
FIG. 8 is a schematic diagram illustrating how an input video sequence is fed into an optimization model in order to derive an output GIF, according to some embodiments.

FIG. 8 is a schematic diagram illustrating how an input video sequence is fed into an optimization model in order to derive an output GIF, according to some embodiments. In some embodiments, the optimization model 810 represents the optimization model 205 of FIG. 2 and contains the same functionality, as described with respect to FIG. 2, except that the image content items are video sequences and GIFs instead of an input and output image.

A GIF (file extension, .gif) is an image file format that is animated by combining several other images (also called "frames") into a single file. This single file is encoded as graphics interchange format (better known as GIF). Unlike the JPEG image format (.jpg), GIFs typically use a compression algorithm referred to as LZW encoding that does not degrade the image quality and allows for easy storing of the file in bytes.

The multiple images within a single GIF file are displayed in succession to create an animated clip or a short movie (e.g., displaying frame 804-4 and then 805-5). In some embodiments, animated GIFs display the sequence of images only once, stopping when the last image or frame is displayed, although it can also loop endlessly or stop after a few sequences.

As illustrated in FIG. 8, the input video sequence 802 includes a set of frames 802-1, 802-1, 802-3, 802-4, 802-5, and 802-6, which is fed into the optimization module 810, for which user feedback is elicited on the input video sequence 802. In some embodiments, users give explicit or implicit feedback on each frame. In some embodiments, users give general feedback without direct reference to a particular frame, but embodiments can map the feedback to specific frames. For example, at a social media web page, implicit user feedback may be elicited where one or more users state, in natural language, that they like a certain actor or certain scene in a movie, where the input video sequence 802 represents the movie. In some embodiments, the optimization model 810 includes Natural Language Processing (NLP) to process such natural language (e.g., via tokenizing and parsing each sentence, Part-of-speech (POS) of each word, performing lexical, semantic, and/or syntactic analysis, etc.) and then map the natural language text to particular frames (e.g., frames 804-4 and 805-5 that contain the actor or scenes) in the input video sequence 802 and feedback scores such that the user feedback score is higher based on the user indicating preferences for the corresponding actors or scenes. Based on the iterative approach to generate multiple variants, as described herein, particular embodiments then responsively produce the output GIF 808, which include the frames 804-4 and 805-5 derived from the input video sequence 802 (e.g., because user feedback scores indicating the actor or scene exceeded a threshold or was chosen as the maximum of an objective function).

Experimental Results

As described herein, various embodiments improve existing technologies in terms of accuracy, among other things. The inventors have conducted experiments with regard to accuracy and visual quality, as described in more detail below. For instance, FIG. 9 is a schematic diagram illustrating a Visual Turing Test, which indicates some improvements over existing technologies based on users being unable to distinguish manually user-enhanced images from model-enhanced images, according to embodiments described herein.

Each participant is shown a pair of images 902 and 904 in which one image is directly enhanced by a human, such as via image editing software, while the other image is the optimal variant generated by various models or methods (i.e., a model that uses FIG. 4 and FIG. 5 for user feedback, a deep learning-based aesthetic scorer (e.g., a model that does not use human feedback), and the original image). Without revealing the origin of images (human or one of the models above), each participant is asked the question "Which image do you think is more likely to have been enhanced by a human?" The goal of this test is to determine how realistic the model-generated variants looks when compared to the human-enhanced variant. For each of two images 902 and 904, particular embodiments record responses for each image and record the number of times participants chose the human-enhanced image. To mitigate any bias, particular embodiments record another set of responses for each by swapping the positions of images 902 and 904. Each image set is thus compared (e.g., N=500 times).

A Turing test is a test where a human is unable to distinguish machine generated content from human generated content. Define p as the probability that a user will choose the human enhanced image when shown a pair (with exactly one human enhanced image) and asked the question above. For the machine to generate indistinguishable content, it is expected that p=½. Thus, the following one-sided hypothesis test is conducted:

$$H_0: p = 1/2 \text{ against } H_1: p > 1/2.$$

Let $N_1$ be the number of users who correctly identify a human enhanced image for a comparison when exposed to N users. Then, $\hat{p}=N_1/N$. The above hypothesis is then tested with the test statistic $(\hat{p}-p)/\sqrt{(\hat{p}(1-\hat{p}))/N}$, which is asymptotically normal with mean 0 and standard deviation 1, under the null hypothesis. Rejecting the null hypothesis (at the type I error of 5%) for a set shows that the human subjects are able to detect a human enhanced image. A sample size of 500 for each image pair gives sufficient statistical power to detect the alternative hypothesis (p>½). For example, if the true value of p is 0.6, the sample size gives a 99% chance of accepting the null hypothesis. If the true value of p is 0.55 there is a 72% chance of accepting the null hypothesis.

The findings are summarized in the tables 906 and 908. In the first two rows of table 906, for a total of 1000 participants, about half of our AMT participants were unable to distinguish between the human enhanced and variant generated by a model using human feedback (e.g., the model 205 of FIG. 2). Whereas in the case of the human edited versus DL-feedback scorer and human vs the original image (bottom two rows in table 906) a greater proportion of participants were able to identify the human edited image. Similarly, it becomes more clear from the table 908 top two rows for both Image 902 and Image 904, that participants were more confused in identifying the human-edited version for Image 906. The null hypothesis is rejected for DL-feedback scorer and the original image. This shows that a majority of the AMT participants are easily able to detect the human enhanced image when contrasted with these alternatives and thus, these methods fail the Visual Turing test. For embodiments that use FIG. 4, the users are able to distinguish the human enhanced image for image 902 but not for image 904. Embodiments that use FIG. 4 clear the Visual Turing test for both images 902 and 904, while models that use FIG. 4 clears the Turing test for one of the two images. For embodiments that use FIG. 5, AMT participants are unable to distinguish the human enhanced image for both images. Thus, it is observed that models described herein that elicit user feedback according to FIG. 5 was more successful, as the setup of the study helped normalize intra-rater bias. Accordingly, this indicates that the output or selected images produced by some embodiments does indeed represent aesthetically desirable or high quality images with accuracy because users are unable to distinguish original images with variation images produced by a model.

Example Flow Diagrams

Figure 10:
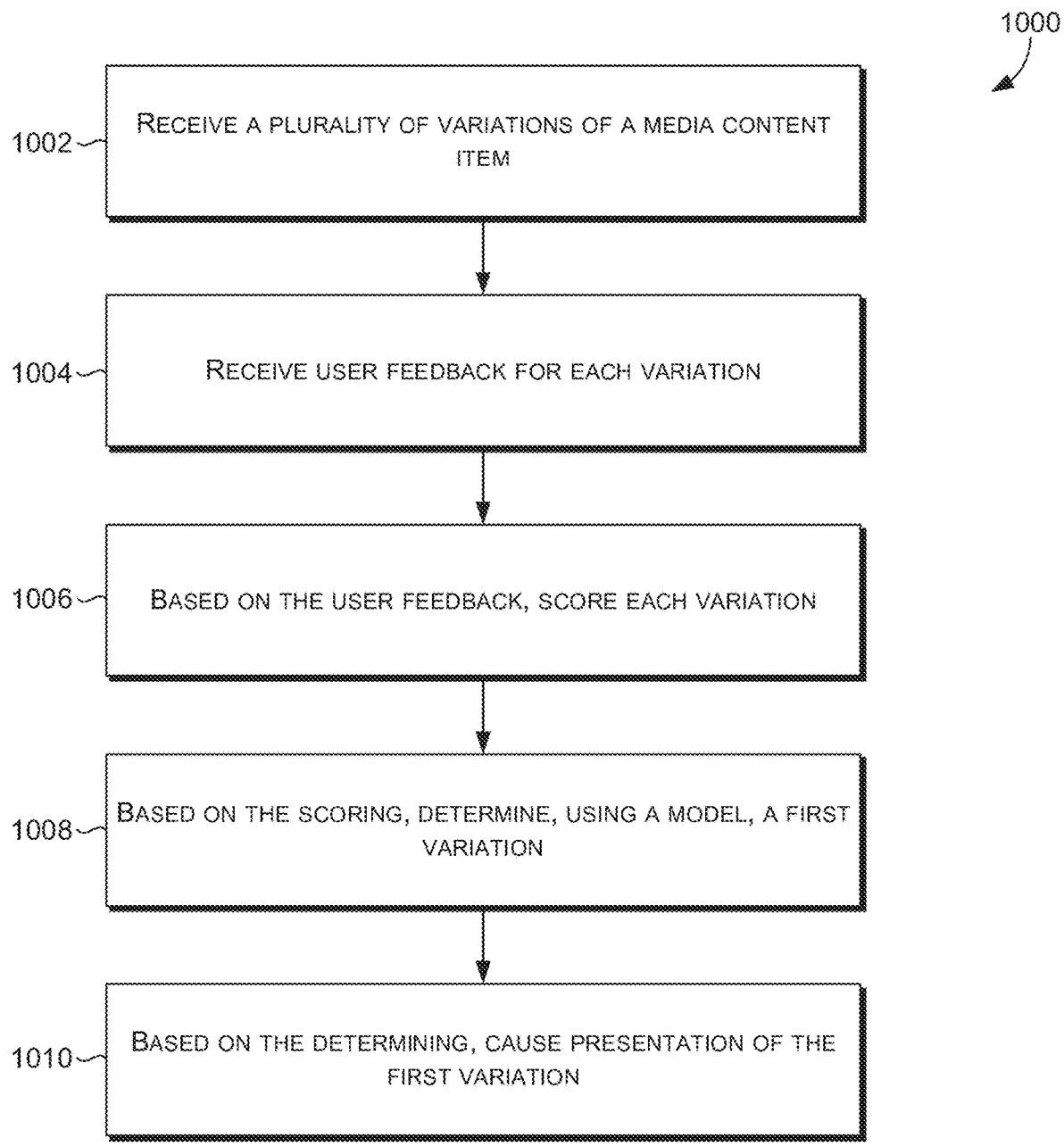
FIG. 10 is a flow diagram of an example process for determining a variation based on a user feedback score, according to some embodiments.

FIG. 10 is a flow diagram of an example process 1000 for determining a variation based on a user feedback score, according to some embodiments. The process 1000 (and/or any of the functionality described herein, such as 11000) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 11). The computer-implemented method, the system (that includes at least one computing device having at least one processor and at least one computer readable storage medium), and/or the computer readable medium as described herein may perform or be caused to perform the process 1100 or any other functionality described herein.

Per block 1002, a plurality of variations of a media content item are received. In some embodiments, each variation, of the plurality of variations, resembles the media content item except that each variation has one or more feature values that are not included in the media content item. Examples of block 1002 are described with respect to the variation generator 102 of FIG. 1. For example, as described with respect to FIG. 3, the variations 302 are generated by the variation generator 102 of FIG. 1.

In some embodiments, one or more feature values of each variation, of the plurality of variations, are manually set by a user. Examples of this are described with respect to FIG. 6A, where the user manually sets the saturation value and the vibrance value ranges. In some embodiments, the media content item represents or includes a digital image (e.g., of real world scenery or art work). In some embodiments, the media content item represents or includes a video (and the first variation determined includes a GIF video), as described with respect to FIG. 8.

In some embodiments, the one or more feature values that are not included in the media content item include particular pixel values (e.g., brightness, contrast, sharpness, saturation, etc.) such that each of the plurality of variations included a set of pixels with different pixel values relative to a corresponding set of pixels of the content image. For example, referring back to FIG. 3, the content item may represent $I_1$ of the variations 302 and the variations may represent $I_{2-10}$ of the variations 302. Accordingly, as represented in FIG. 3, each of these variations have differing brightness, and sharpness pixel values. In some embodiments, "corresponding set of pixels" means that the position, orientation, or quantity of the set of pixels has not changed from a media content item and a variation but only some value (e.g., a filtering value) that makes up the set of pixels. For example, a media content item may have a set of pixels representing a cat. The variation may have a corresponding number of pixels in the same position representing the same cat, but the color of the cat may be different. Put differently, the pixels representing real world objects, background, or payloads may be the same between content items and variations, but the intensity or filtering of such pixels may be different.

In some alternative embodiments, the one or more feature values that are not included in the media content item include or represent a set of pixels representing real world objects such that each variation of the plurality of variations include the set of pixels representing real world objects that are not included in the media content item. Examples of this are described with respect to FIG. 7. For example, a media content item is image may be image 702 and the variation for the image 702 may be image 708, where the image 708 includes pixels 712 representing the older male, which are not included in the image 702.

Per block 1004, particular embodiments receive user feedback for each variation. The user feedback may indicate one or more preferences associated with each variation of the plurality of variations. Examples of block 1004 are described with respect to receiving the audience feedback 304 of FIG. 3, the feedback handler 104 of FIG. 1, FIG. 4, and FIG. 5.

In some embodiments, the user feedback received at block 1004 includes a user rating of a particular variation, of the plurality of variations, based on showing the particular variation to a second user and prompting the second user to rate the particular variation. Examples of this are described with respect to FIG. 4 and FIG. 5. In some embodiments, the user feedback alternatively or additionally includes user input at a user interface page (e.g., a web or app page) that includes a variation, of the plurality of variations, where the user feedback includes at least one of: a click of a button at a user interface page (e.g., to purchase of a product, to request to share a variation, to "like" a feature on the UI page, etc.), and a view of the user interface page. A view may include anytime a browser or other component renders the user interface page to a user device regardless of whether the user makes any selections.

Per block 1006, some embodiments score (or determine a score) each variation based on the user feedback. Examples of block 1006 are described with respect to the variation scorer 108 of FIG. 1, FIG. 4, and FIG. 5. For example, several users may have rated an image quality on a scale of 1 to 5, with 5 being the highest, at rating of 3. Accordingly, this integer is summed, averaged, weighted, or otherwise aggregated to arrive at the final score for the image.

Per block 1008, particular embodiments determine, using a model, a first variation based on the scoring of block 1006. Examples of block 1008 are described with respect to the variation selector 112, image 616 of FIG. 6B (the "best variant seen so far," image 616 of FIG. 6C, the output image variant 206, among other examples. In some embodiments, the "determining" of the first variation at block 1008 includes "generating" the first variation, where the first variation is not included among the plurality of variations (i.e., it is a new variation). Examples of this are described with respect to FIG. 3, where the surrogate or belief model 306 can generate an entirely new variation with differing feature values relative to one or more of the variations 302 based on what the feedback scores were. Alternative or additionally, the "determining" the first variation can simply mean to sample or choose a variation among the plurality of variations that had the highest feedback score, such as choosing which of the variations 302 had the highest feedback score.

In some embodiments, the determining of the first variation is based on using a model that approximates a distribution associated with the user Feedback. Examples of this are described herein with respect to the active learning models and the BO models (as well as reinforcement learning). For example, in some embodiments, the model is a Bayesian Optimization model that approximates the distribution of an objective function using a surrogate function, where, for example, the first variation represents a maximum of the objective function, which indicates a highest scoring variation according to the user feedback, as described with respect to the model 306 of FIG. 3. However, the first variation need not represent the maximum or highest scoring variation for all sampled/generated variations, but represent a highest scoring variation for a single iteration (e.g., the "best variation seen so far" for image 616). It is understood that any model may be used that does not necessarily approximate a distribution associated with user feedback.

As described above, in some embodiments, the determining of the first iteration may represent a single iteration, cycle, or epoch, which means that embodiments continue to determine additional iterations. For example, subsequent to the determining of the first variation, some embodiments determine, via the model, a second set of variations that resemble the content item. Based on the determining of the second set of variations, particular embodiments receive second user feedback for each variation of the second set of variations. Based on the second user feedback, particular embodiments score (or determine the score of) each variation of the second set of variations. Based on the scoring of the second set of variations, particular embodiments determine a second variation. Subsequently, particular embodiments select (e.g., via the variation selector 112) the first variation instead of the second variation based on the score of the first variation being higher relative to the second variation. Examples of this are described with respect to FIG. 6B, 6C, and FIG. 3, where embodiments iteratively generate or sample variations based on different rounds of feedback and then select which variation has the highest feedback score. In some embodiments, the causing presentation of the first variation is further based on the selecting of the first variation (e.g., showing a ranked list of variations where the first variation is ranked highest based on its score).

In some embodiments, iteratively scoring variations to determine the first variation is a part of training or optimizing a model. In other words, for example, in response to block 1008, a loop may be performed such that blocks 1002 through 1008 keep occurring until a surrogate function is learned or a loss is minimized to an acceptable level between a ground truth and predictions (for training a machine learning model).

In some embodiments, with respect to machine learning, training includes minimizing a loss function between the target variables (e.g., the ground truth objective function) and the actual variable (e.g., the surrogate function), such as to have no (or minimal) mismatch between target and actual predictions. Based on the loss determined by a loss function (e.g., Mean Squared Error Loss (MSEL), cross-entropy loss, etc.), the loss function learns to reduce the error in prediction over multiple epochs or training sessions so that the model learns which features and weights are indicative of generating or predicting the first variation (e.g., the variation with the highest feedback score). Accordingly, it may be desirable to arrive as close to 100% confidence in a particular classification and/or output value as possible so as to reduce the prediction error. Even though an objective function is unknown, various embodiments formulate a function representing the objective function in order to compute the distance. For example, the objective function may represent actual feedback scores of several variations or automated scores that a model (not a human provides) after several variations so that the surrogate function can be compared with the objective function for loss determination.

A "weight" in various instances represents the importance or significant of a feature or feature value for classification or prediction. For example, each feature may be associated with an integer or other real number where the higher the real number, the more significant the feature is for its label or classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores. In many instances, only a selected set of feature values (e.g., a particular sharpness value) are primarily responsible for a determination of whether a variation will be selected or is optimal. Accordingly, with respect to training a neural network, a node corresponding to these selected set of feature values will approach 1 in order to be activated.

In some embodiments, subsequent to the training or optimization of a model as described with respect to block 1008, particular embodiments receive a first media content item. For example, after the model has been deployed, a user may upload a content item. Then some embodiments determine the plurality of variations. Particular embodiments then change first one or more feature values of the first media content item to second one or more feature values based on the scoring of each variation, of the plurality of variations. Examples of this are described with respect to FIG. 2 where, for example, feature vectors or hashes are compared to determine content and then the highest scoring trained on variation is chosen so that the first media content item reflects the parameter values for the highest scoring variation. Other examples of this are described with respect to FIG. 11.

Per block 1010, based on the determining, some embodiments cause presentation of the first variation. Examples of this are described with respect to FIGS. 6B and 6C, where the images 616 and 622 are presented to a user. In some embodiments, block 1010 includes causing the first variation to be produced at an application page (e.g., a web or app page) as part of a digital marketing campaign. For example, the first variation can be produced as part of an advertisement for a product for sale at a search engine page, a website page, an email page, a social media page, or the like. In some embodiments, the first variation is produced as part of an item listing of an electronic marketplace, where the first variation represent an item for sale at the electronic marketplace.

Figure 11:
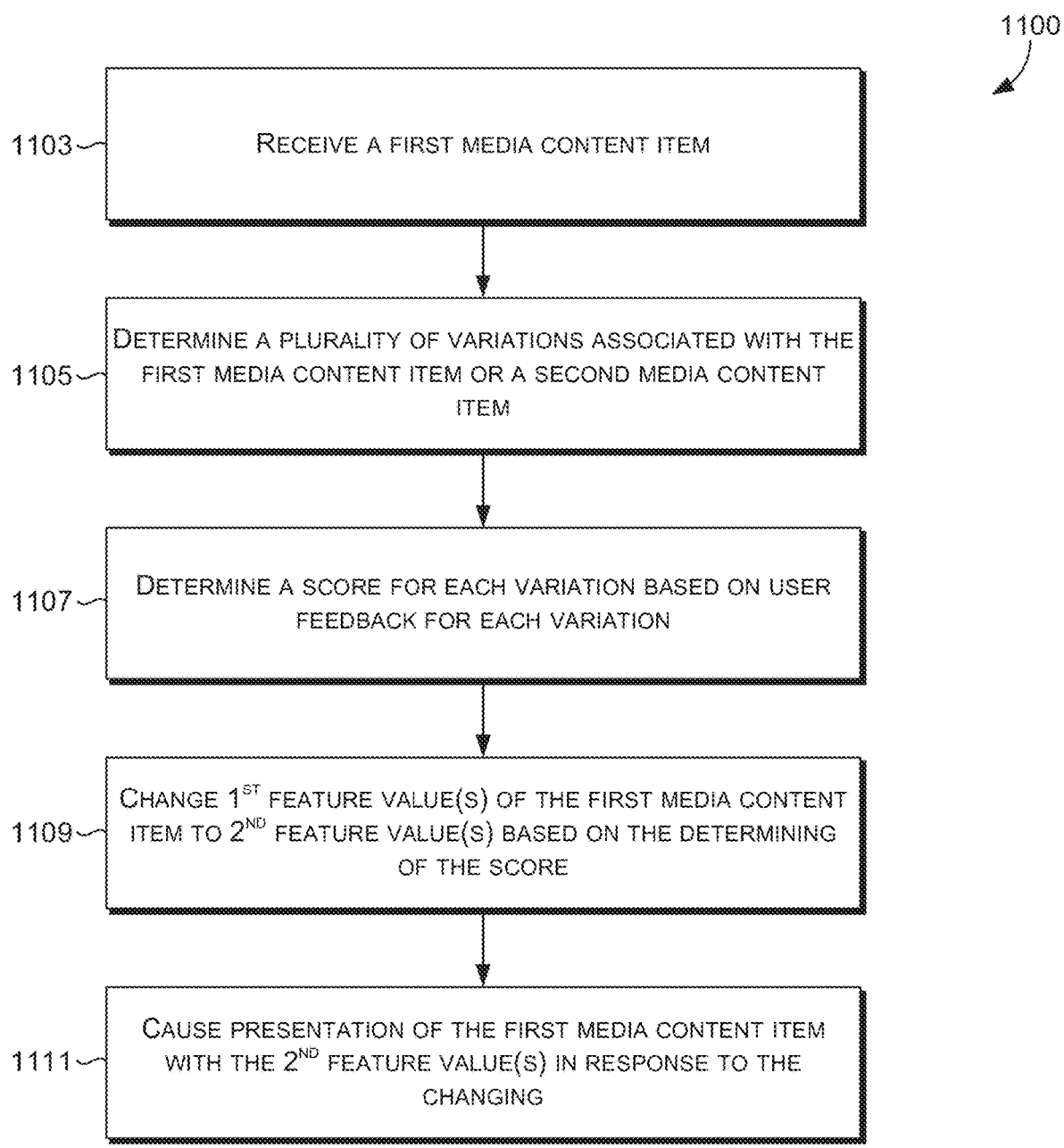
FIG. 11 is a flow diagram of an example process for changing feature values of a media content item based on user feedback scores of variations, according to some embodiments.

FIG. 11 is a flow diagram of an example process 1100 for changing feature values of a media content item based on user feedback scores of variations, according to some embodiments. In some embodiments, the process 1100 represents functionality that occurs after a model has been trained, tested, deployed or optimized (e.g., subsequent to the process 1000 of FIG. 10). Alternatively, in some embodiments, the process 1100 represents the training or optimization of a model.

Per block 1103, some embodiments (e.g., the variation generator 102) receive a first media content item. Examples of this are described with respect to receiving of the input image 203 of FIG. 2 or the input video sequence 802 of FIG. 8. Per block 1105, some embodiments (e.g., the variation generator 102) determine a plurality of variations associated with the first media content item or a second media content item. Examples of determining the plurality of variations associated with a second media content item are described with respect to the optimization model 205 of FIG. 2 after it has been optimized. For example, the plurality of variations may represent variations of a second media content item that the model has already trained on. Examples of the determining of the plurality of variations associated with the first media content item are described with respect to FIG. 3. For example, particular embodiments can receive or generate the variations 302 of FIG. 3.

Per block 1107, some embodiments (e.g., the variation scorer 108) determine a score for each variation, of the plurality of variations, based on user feedback for each variation. The user feedback indicates one or more preferences associated with each variation. Examples of this are described with respect to the optimization model 205 of FIG. 2, the variation scorer 108 of FIG. 1, and the audience feedback 304 of FIG. 3. For example, where the plurality of variations are associated with the second media content item, the model may have already scored each variation of the second media content item as part of optimization or training. Accordingly, these embodiments can look up or search these scores previously generated. In another example, the determining of the score can additionally or alternatively include determining a distance between a feature vector representing the first media content item and feature vectors representing the variations of the second media content item and selecting the closest variation to the first media content item (e.g., as described with respect to FIG. 2). In other embodiments, where the plurality of variations are associated with the first media content item, the model may score each variation of the first media content item, such as during optimization or training.

Per block 1109, some embodiments (e.g., the variation selector 112) change one or more first feature values of the first media content item to one or more second feature values based on the determining of the score. For example, where the model has been trained or optimized prior to the receiving of the first media content item, embodiments can perform the change based on user feedback of variations of the first media content item or based on user feedback of variations of the second media content item (e.g., based on determining a hash or distance difference between the first media content item and the second media content item and then changing the feature values of the first media content item to match those feature values of the highest scoring variation of the second media content item).

Per block 1111, some embodiments (e.g., the presentation component 116) cause presentation of the first media content item with the second one or more feature values in response to the changing. For example, this may represent the output image 209 of FIG. 2, which is caused to be presented at a user interface of a user device.

Exemplary Operating Environments

Figure 12:
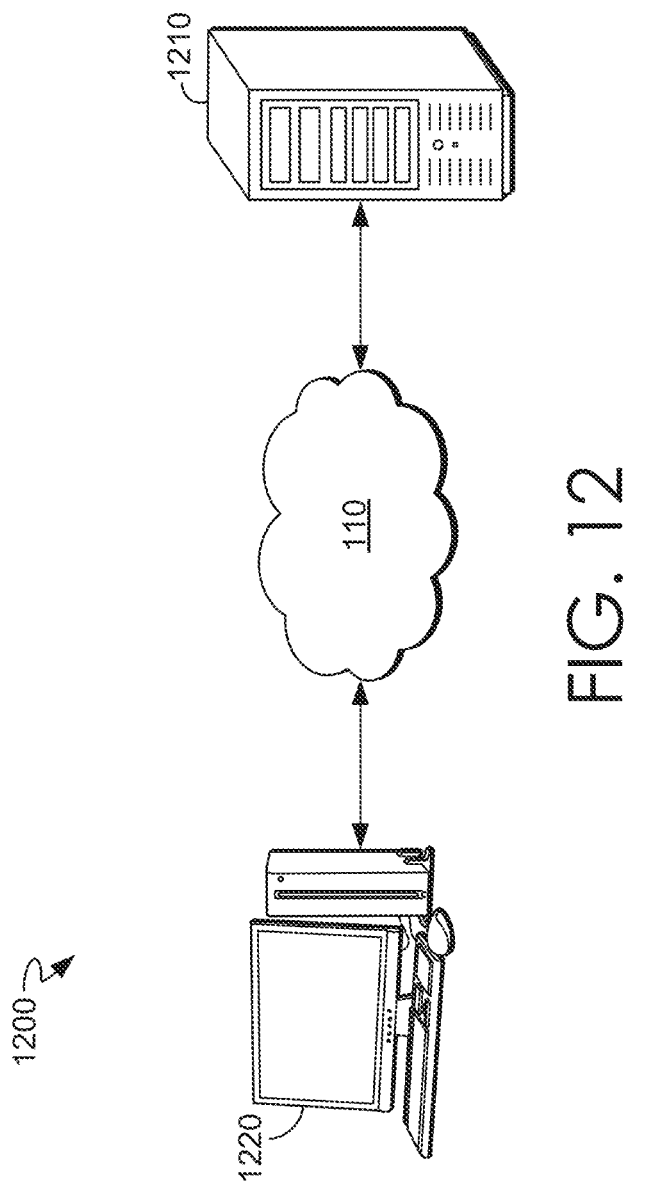
FIG. 12 is an example computer environment in which aspects of the present disclosure are employed, according to some embodiments.

Turning now to FIG. 12, a schematic depiction is provided illustrating an example computing environment 1200 for determining a variation, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1210 that represent nodes in a cloud computing network. Various functions described herein as being performed by one or more entities may be carried out by hardware, firmware, and/or software. For instance, various functions may be carried out by a processor executing instructions stored in memory.

The environment 1200 depicted in FIG. 12 includes a prediction server ("server") 1210 that is in communication with a network(s) 110. The environment 1200 further includes a client device ("client") 1220 (also referred to a "user device") that is also in communication with the network(s) 110. Among other things, the client 1220 can communicate with the server 1210 via the network(s) 110, and generate for communication, to the server 1210, a request to make a detection, prediction, or classification of one or more instances of a document/image. The request can include, among other things, a request to enhance a content item (e.g., via uploading an input image). In various embodiments, the client 1220 is embodied in a computing device, which may be referred to herein as a client device or user device, such as described with respect to the computing device 1300 of FIG. 13. In some embodiments, each component in FIG. 1 is included in the server 1210 and/or the client device 1220. Alternatively, in some embodiments, the components of FIG. 1 are distributed between the server 1210 and client device 1220.

The server 1210 can receive the request communicated from the client 1220, and can search for relevant data via any number of data repositories to which the server 1210 can access, whether remotely or locally. A data repository can include one or more local computing devices or remote computing devices, each accessible to the server 1210 directly or indirectly via network(s) 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1210 is embodied in a computing device, such as described with respect to the computing device 1300 of FIG. 13.

Figure 13:
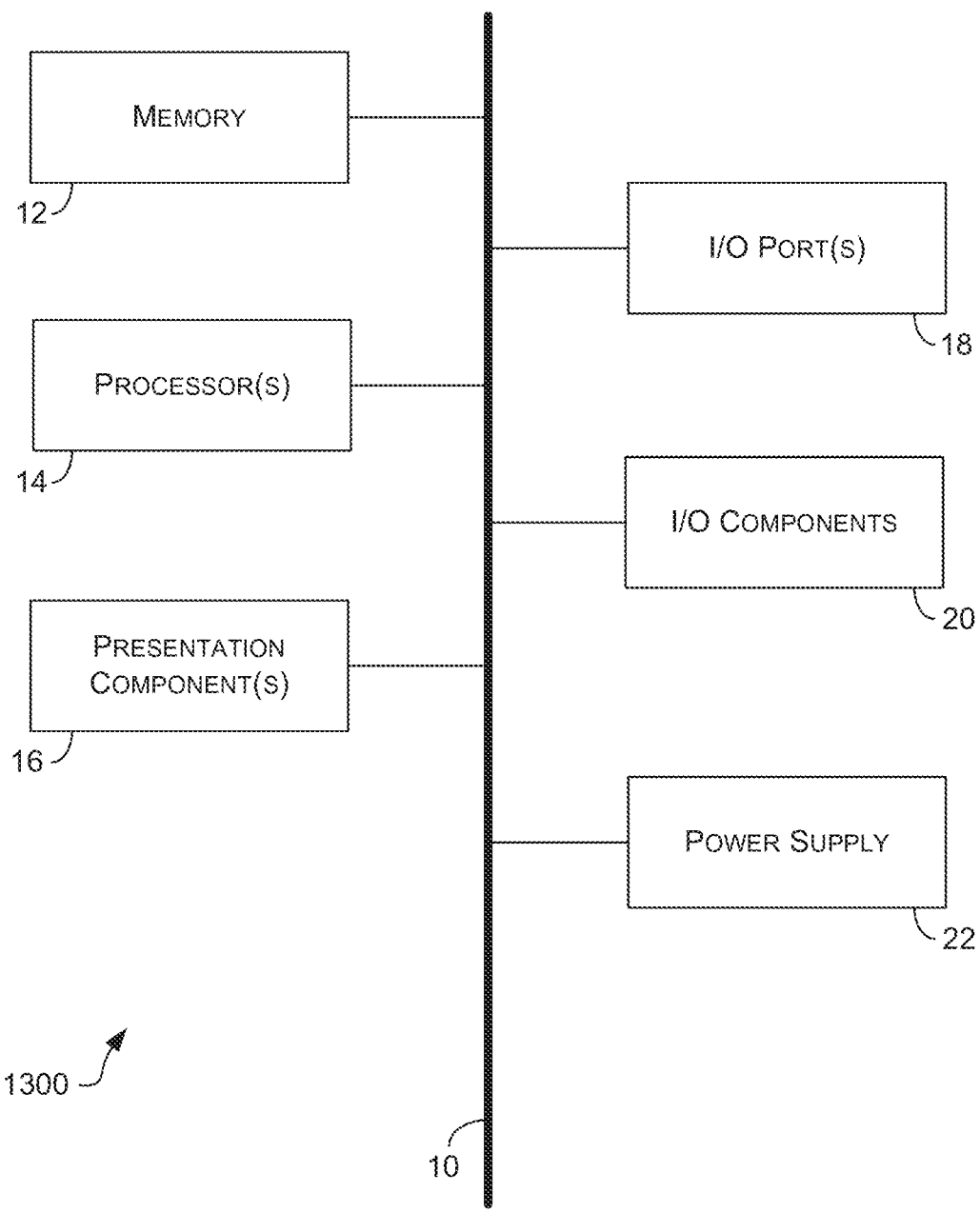
FIG. 13 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

Looking now to FIG. 13, computing device 1300 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1300 represents the client device 1220 and/or the server 1210 of FIG. 12.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 1000 of FIG. 10, process 1100 of FIG. 11, or any functionality described with respect to FIGS. 1 through 13.

I/O ports 18 allow computing device 1300 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer readable medium storing computer-usable instructions that, when used by one or more processors, cause the one or more processors to perform operations comprising:
  receiving a media content item that is an image of a plurality of pixel values; converting the media content item into a first feature vector representative of the plurality of pixel values in search space;

receiving an indication that a user has set a boundary or range of parameter values for which a model will generate variations from:
based on the boundary or range and the first feature vector, automatically generating a plurality of variations of the media content item by automatically changing in the search space, the first feature vector representative of a change in at least one of, vibrance, saturation, brightness, contrast, or sharpness of one or more of the plurality of pixel values, each variation, of the plurality of variations, being a different version of the image; receiving explicit user feedback for each variation of the plurality of variations, wherein the explicit user feedback corresponds to a scaled user rating of a respective variation of the plurality of variations according to an aesthetic preference for the respective variation; based on the explicit user feedback, scoring each variation of the plurality of variations according to the scaled user rating of the respective variation; based on the changing, in the search space, the first feature vector and the scoring of each variation, automatically generating, via a Bayesian Optimization Model a first variation of the image based on using a surrogate function that models an objective function representing a true distribution of user feedback for the plurality of variations by sampling, in the search space, at least a second feature vector representing the first variation based on minimizing a distance to the objective function evaluated at a maximum, wherein the first variation represents the maximum of the objective function and the maximum indicates a highest scoring variation according to the user feedback; based on the generating of the first variation, generating an output image of pixel values that represent the first variation; and based on the generating of the output image, causing
presentation, at a computing device associated with the user, of the output image.

2. The non-transitory computer readable medium of claim 1, wherein the user feedback includes a user rating of a particular variation, of the plurality of variations, based on showing the particular variation to a second user and prompting the second user to rate the particular variation.

3. The non-transitory computer readable medium of claim 1, wherein the generating of the first variation is based further on receiving additional user feedback includes user input at a user interface, and wherein the additional user feedback includes at least one of: a purchase of an item associated with the variation, a click of a button at a user interface page, and a view of the user interface page.

4. The non-transitory computer readable medium of claim 1, wherein the media content item includes a video, and wherein the first variation includes a Graphics Interchange Format (GIF) of the video.

5. The non-transitory computer readable medium of claim 1, wherein the one or more processors are caused to perform further operations comprising:
subsequent to the generating of the first variation, generating, via the model, a second set of variations that resemble the media content item; based on the generating of the second set of variations, receiving second user feedback for each variation of the second set of variations; based on the second user feedback, scoring each variation of the second set of variations; based on the scoring of the second set of variations, generating a second variation; and selecting the first variation instead of the second variation based on a score of the first variation being higher relative to the second variation, and wherein the causing presentation of the output image is further based on the selecting of the first variation.

6. The non-transitory computer readable medium of claim 1, wherein the causing presentation includes causing the the output image to be produced at an application page as part of a digital marketing campaign.

7. The non-transitory computer readable medium of claim 1, wherein each of the plurality of variations include a set pixels with different values relative to a corresponding set of pixels of the image.

8. The non-transitory computer readable medium of claim 1, wherein each variation of plurality of variations include a set of pixels representing real world objects that are not included in the media content item.

9. The non-transitory computer readable medium of claim 1, wherein the generating of the first variation is part of training or optimizing the model, and wherein the one or more processors further include operations comprising:
receiving, subsequent to the generating of the first variation, a first media content item; determining the plurality of variations; and changing first one or more image data-values of the first media content item to second one or more image data-values based on the scoring of each variation of the plurality of variations.

10. A computerized system, comprising:
at least one processor; and
at least one computer readable storage medium storing computer instructions that when executed by the at least one processor cause the at least one processor to perform operations comprising:
receiving a first media content item, the first media content item being an image or set of images that include a plurality of pixel values;
converting the first media content item into a first feature vector representative of the plurality of pixel values in search space:
generating a plurality of variations associated with the first media content item or a second media content item based at least in part on the converting and changing, in the search space, one or more values of the first feature vector, each variation, of the plurality of variations, resembling the image or set of images except each variation includes a change in at least one of, vibrance, saturation, brightness, contrast, or sharpness of one or more of the plurality of pixel values;
determining a score for each variation of the plurality of variations based on explicit user feedback for each variation, wherein the explicit user feedback corresponds to a scaled user rating of aesthetic preference for a respective variation of the plurality of variations according to one or more users;
changing first one or more pixel values of the plurality of pixel values to second one or more pixel values based on the explicit user feedback and using a surrogate function that models an objective function representing a true distribution of user feedback for the plurality of variations by sampling, in the search space, at least a second feature vector representing a first variation based on minimizing a distance to the objective function evaluated at a maximum;
based at least in part on the changing of the first one or more pixel values to the second one or more pixel values, generating an output image of pixel values that represents the first variation; and causing presentation, at a computing device associated with a user, of the output image.

11. A computer-implemented method comprising:
receiving a media content item that is an image of a plurality of pixel values;
converting the media content item into a first feature vector representative of the plurality of pixel values in search space;
receiving an indication that a user has set a boundary or range of parameter values for which a model will generate variations from
based at least in part on the first feature vector and the boundary or range, generating a plurality of variations of media content item by changing one or more values of the first feature vector in the search space, each variation, of the plurality of variations, resembles the media content item except that each variation has one or more of, vibrance, saturation, brightness, contrast, or sharpness that are not included in the image or set of images;
receiving explicit user feedback for each variation, of the plurality of variations, wherein the explicit user feedback corresponds to a scaled user rating of aesthetic preference for a respective variation of the plurality of variations according to one or more users;
based on the explicit user feedback, scoring each variation of the plurality of variations according to the scaled user rating of the respective variation;
based on the scoring and the changing of the one or more values of the first feature vector, sampling, via the model and in the search space, a second feature vector representing a first variation of the image or set of images based at least in part on using a surrogate function that models an objective function representing a true distribution of user feedback for the plurality of variations and further based on minimizing a distance to the objective function evaluated at a maximum;
and based on the sampling of the first feature vector generating an output image of pixel values that represent the first variation.

12. The computer-implemented method of claim 11, wherein the model is a Bayesian Optimization algorithm, that approximates a distribution of the objective function with the plurality of variations, and wherein the maximum indicating a highest scoring variant according to the explicit user feedback.

13. The computer-implemented method of claim 11, wherein the explicit user feedback includes a user rating of a particular variation, of the plurality of variations, based on showing the particular variation to a second user and prompting the second user to rate the particular variation.

14. The computer-implemented method of claim 11, wherein the media content item includes a video, and wherein the first variation includes a Graphics Interchange Format (GIF) of the video.

15. The computer-implemented method of claim 11, further comprising:
in response to the generating of the first variation, determining a second set of variations of the plurality of variations, the determining of the second set of variations being part of a function that approximates a distribution associated with the user feedback;
based on the determining of the second set of variations, receiving second user feedback for each variation of the second set of variations;
based on at least a portion of the second user feedback, scoring each variation of the second set of variations;
based on the scoring of the second set of variations, determining a second variation; and
selecting the first variation instead of the second variation based on a score of the first variation being higher, and wherein the causing presentation of the first variation is further based on the selecting of the first variation.

16. The non-transitory computer readable medium of claim 10, wherein the surrogate function that models the objective function representing a true distribution is based on using the Bayesian Optimization model that models the objective function associated with the user feedback includes generating the first variation using the model that approximates a ground truth distribution of user feedback scores, wherein the user feedback represents only a portion of the ground truth distribution of user feedback scores.

17. The computerized system of claim 10, wherein the changing is based on using a model that has been trained or optimized, prior to the receiving of the first media content item, based on the user feedback, and wherein the plurality of variations are variations of the second media content item.

* * * * *